(12) United States Patent
Fu et al.

(10) Patent No.: US 11,520,771 B2
(45) Date of Patent: Dec. 6, 2022

(54) MEASUREMENT UPDATE METHOD, APPARATUS, SYSTEM, STORAGE MEDIA, AND COMPUTING DEVICE

(71) Applicant: Alibaba Group Holding Limited, Grand Cayman (KY)

(72) Inventors: Yingfang Fu, Beijing (CN); Peng Xiao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 353 days.

(21) Appl. No.: 16/698,377

(22) Filed: Nov. 27, 2019

(65) Prior Publication Data
US 2020/0174995 A1    Jun. 4, 2020

(30) Foreign Application Priority Data
Nov. 30, 2018  (CN) .......................... 201811459675.7

(51) Int. Cl.
*G06F 16/23* (2019.01)
*G06F 16/22* (2019.01)

(52) U.S. Cl.
CPC ...... *G06F 16/2365* (2019.01); *G06F 16/2255* (2019.01)

(58) Field of Classification Search
CPC .......................... G06F 16/2365; G06F 16/2255
USPC ....................................................... 707/690
See application file for complete search history.

(56) References Cited

U.S. PATENT DOCUMENTS

| | | | | |
|---|---|---|---|---|
| 2002/0057828 A1* | 5/2002 | Oosawa | .................... | G06T 7/60 382/132 |
| 2008/0013089 A1* | 1/2008 | Ishii | ...................... | G03F 9/7011 356/400 |
| 2008/0109511 A1* | 5/2008 | Tang | ........................ | G06F 21/10 726/1 |
| 2010/0317420 A1* | 12/2010 | Hoffberg | ............ | G06Q 30/0282 463/1 |
| 2010/0329118 A1* | 12/2010 | Adams | .................. | H04L 47/827 370/235 |
| 2012/0130666 A1* | 5/2012 | Cho | ................. | G01N 21/95684 702/87 |
| 2016/0282980 A1* | 9/2016 | Chintalapoodi | .. | G06F 3/041662 |
| 2016/0283017 A1* | 9/2016 | Fotopoulos | ......... | G06F 3/04186 |

(Continued)

*Primary Examiner* — James Trujillo
*Assistant Examiner* — Fariborz Khoshnoodi
(74) *Attorney, Agent, or Firm* — Lee & Hayes, P.C.

(57) ABSTRACT

Methods, apparatuses, systems, storage media, and computing devices for updating a measurement are disclosed. One of the methods includes: detecting that an application device initiates a measurement update, wherein the measurement update includes at least one of: an object update that updates a measurement object, and a policy update that updates a policy; and performing measurement update processing upon verifying that the measurement update satisfies a predetermined condition, wherein the measurement update processing includes performing an update process on at least one of content included in an execution of a measurement process, and wherein the measurement process includes calculating a measurement object using a predetermined algorithm, comparing a calculation result with a pre-stored verification reference value, and determining that an integrity of the measurement object is not corrupted if a comparison result is consistent.

20 Claims, 12 Drawing Sheets

(56) References Cited

U.S. PATENT DOCUMENTS

| | | | | |
|---|---|---|---|---|
| 2016/0359913 A1* | 12/2016 | Gupta | ............... | H04L 63/1425 |
| 2017/0034023 A1* | 2/2017 | Nickolov | ............ | H04L 43/0817 |
| 2017/0187570 A1* | 6/2017 | Estrada | ............... | H04L 41/0893 |
| 2017/0295195 A1* | 10/2017 | Wettstein | ................ | G06F 21/57 |
| 2019/0018143 A1* | 1/2019 | Thayer | ................... | G01S 17/89 |

\* cited by examiner

MEASUREMENT UPDATE METHOD, APPARATUS, SYSTEM, STORAGE MEDIA, AND COMPUTING DEVICE

CROSS REFERENCE TO RELATED PATENT APPLICATIONS

This application claims priority to Chinese Patent Application No. 201811459675.7, filed on 30 Nov. 2018 and entitled "Measurement Update method, Apparatus, System, Storage Media, and Computing Device," which is hereby incorporated by reference in its entirety.

TECHNICAL FIELD

The present disclosure relates to the technical field of trusted computing, and particularly to measurement update methods, apparatuses, systems, storage media, and computing devices.

BACKGROUND

In related technologies, deployments for measurement policies mainly include: a deployment of an integrity measurement policy of a hardware platform, a deployment of integrity measurement policy of a system, a deployment of an integrity verification policy of the system, and a deployment of an integrity verification policy of the hardware platform. The policy deployments also include deployments of some special and advanced policies. In such related technologies, in order to implement a policy update, effects thereof must begin only after system-level and platform-level verification policies are updated and restarted. Moreover, a process of policy update also includes multiple restrictions. For example, an update for a policy needs to be performed on a premise of whether another policy exists, or an error is reported. Moreover, when a policy is deleted, a predetermined condition needs to be met. For example, when deleting a policy, it must be deleted before another policy is deleted.

For a process during which a service is needed, a policy needs to be updated at any time and can take effect in time. However, in the above-mentioned process of policy update in the related technologies, a policy cannot be actively updated by a service party in time, a process of updating configurations is cumbersome, and the continuity of the service cannot be guaranteed.

No effective solution has yet been proposed for the above problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide measurement update methods, apparatuses, systems, storage media, and computing devices, so as to at least solve the technical problems in the related technologies that a policy cannot be actively updated by a service party in time, a process of updating configurations is cumbersome, and the continuity of a service cannot be guaranteed.

According to the embodiments of the present disclosure, a measurement update method is provided, which includes: detecting that an application device initiates a measurement update, wherein the measurement update includes at least one of: an object update that updates a measurement object, and a policy update that updates a policy; and performing measurement update processing upon verifying that the measurement update satisfies a predetermined condition, wherein the measurement update processing includes performing an update process on at least one of content included in an execution of a measurement process, and wherein the measurement process includes calculating a measurement object using a predetermined algorithm, comparing a calculation result with a pre-stored verification reference value, and determining that an integrity of the measurement object is not corrupted if a comparison result is consistent.

According to the embodiments of the present disclosure, a measurement update method is provided, which includes: receiving a measurement update request sent by a measurement update monitoring component, wherein the measurement update request is triggered by the measurement update monitoring component in response to detecting a measurement update of an application device, the measurement update request including at least one of: an object update request for requesting an update of a measurement object, and a policy update request for requesting an update of a policy; and performing measurement update processing in response to verifying that the measurement update monitoring component is legitimate, wherein the measurement update processing includes: performing an update process on at least one of content included in an execution of a measurement process, wherein the measurement process includes calculating a measurement object using a predetermined algorithm, comparing a calculation result with a pre-stored verification reference value, and determining that an integrity of the measurement object is not corrupted if a comparison result is consistent.

According to the embodiments of the present disclosure, a measurement update method is also provided, which includes: an application device initiating a measurement update, wherein the measurement update includes at least one of: an object update that updates a measurement object, and a policy update that updates a policy; a measurement update monitoring component detecting that the application device initiates the measurement update, and verifying whether the measurement update satisfies a predetermined condition; and the measurement update monitoring component and/or a policy control center performing measurement update processing if the measurement update satisfies the predetermined condition, wherein the measurement update processing includes: performing an update process on at least one of content included in an execution of a measurement process, wherein the measurement process includes calculating a measurement object using a predetermined algorithm, comparing a calculation result with a pre-stored verification reference value, and determining that an integrity of the measurement object is not corrupted if a comparison result is consistent.

According to the embodiments of the present disclosure, a measurement update apparatus is provided, which is applied to a measurement update monitoring component, and includes: a monitoring module configured to detect that an application device initiates a measurement update, wherein the measurement update includes at least one of: an object update that updates a measurement object, and a policy update that updates a policy; and a first processing module configured to perform measurement update processing upon verifying that the measurement update satisfies a predetermined condition, wherein the measurement update processing includes performing an update process on at least one of content included in an execution of a measurement process, and wherein the measurement process includes calculating a measurement object using a predetermined algorithm, comparing a calculation result with a pre-stored verification reference value, and determining that an integrity of the measurement object is not corrupted if a comparison result is consistent.

According to the embodiments of the present disclosure, a measurement update apparatus is provided, which is applied to a policy control center, and includes: a receiving module configured to receive a measurement update request sent by a measurement update monitoring component, wherein the measurement update request is triggered by the measurement update monitoring component in response to detecting a measurement update of an application device, the measurement update request including at least one of: an object update request for requesting an update of a measurement object, and a policy update request for requesting an update of a policy; and a second processing module configured to perform measurement update processing in response to verifying that the measurement update monitoring component is legitimate, wherein the measurement update processing includes: performing an update process on at least one of content included in an execution of a measurement process, wherein the measurement process includes calculating a measurement object using a predetermined algorithm, comparing a calculation result with a pre-stored verification reference value, and determining that an integrity of the measurement object is not corrupted if a comparison result is consistent.

According to the embodiments of the present disclosure, a measurement update system is provided, which includes: an application device, a measurement update monitoring component, and a policy control center, wherein the application device is configured to initiate a measurement update, wherein the measurement update includes at least one of: an object update that updates a measurement object, and a policy update that updates a policy; the measurement update monitoring component is configured to detect that the application device initiates the measurement update, and verify whether the measurement update satisfies a predetermined condition; and the measurement update monitoring component and/or a policy control center is/are configured to perform measurement update processing if the measurement update satisfies the predetermined condition, wherein the measurement update processing includes: performing an update process on at least one of content included in an execution of a measurement process, wherein the measurement process includes calculating a measurement object using a predetermined algorithm, comparing a calculation result with a pre-stored verification reference value, and determining that an integrity of the measurement object is not corrupted if a comparison result is consistent.

According to the embodiments of the present disclosure, a storage medium is provided, the storage medium including a stored program, wherein the program, when running, controls a device where the storage medium is located to perform any one of the measurement update methods that are described above.

According to the embodiments of the present disclosure, a computing device includes: a memory and a processor, the memory storing a computer program, the processor configured to execute the computer program stored in the memory, and the computer program, when running, performing any one of the measurement update methods that are described above.

In the embodiments of the present disclosure, by using an application device to actively update a measurement that needs to be updated, and detecting that the measurement is updated by the application device, measurement update processing is performed upon verifying that a measurement update satisfies a predetermined condition, thus achieving the purpose of actively updating the measurement object, a measurement policy, and a corresponding verification policy by a service party (i.e., the application device). This thereby realizes the technical effects of updating content of the measurement object and the measurement policy that need to be updated in time, and hence solving the technical problems of the related technologies that a service party fails to actively update a policy in time, a process of updating configurations is cumbersome, and the continuity of a service cannot be guaranteed.

BRIEF DESCRIPTION OF THE DRAWINGS

Accompanying drawings described herein are intended to provide a further understanding of the present disclosure, and form a part of the present disclosure. Exemplary embodiments of the present disclosure and descriptions thereof are used for describing the present disclosure, and are not construed as improper limitations to the present disclosure. In the drawings.

DETAILED DESCRIPTION

Figure 1:
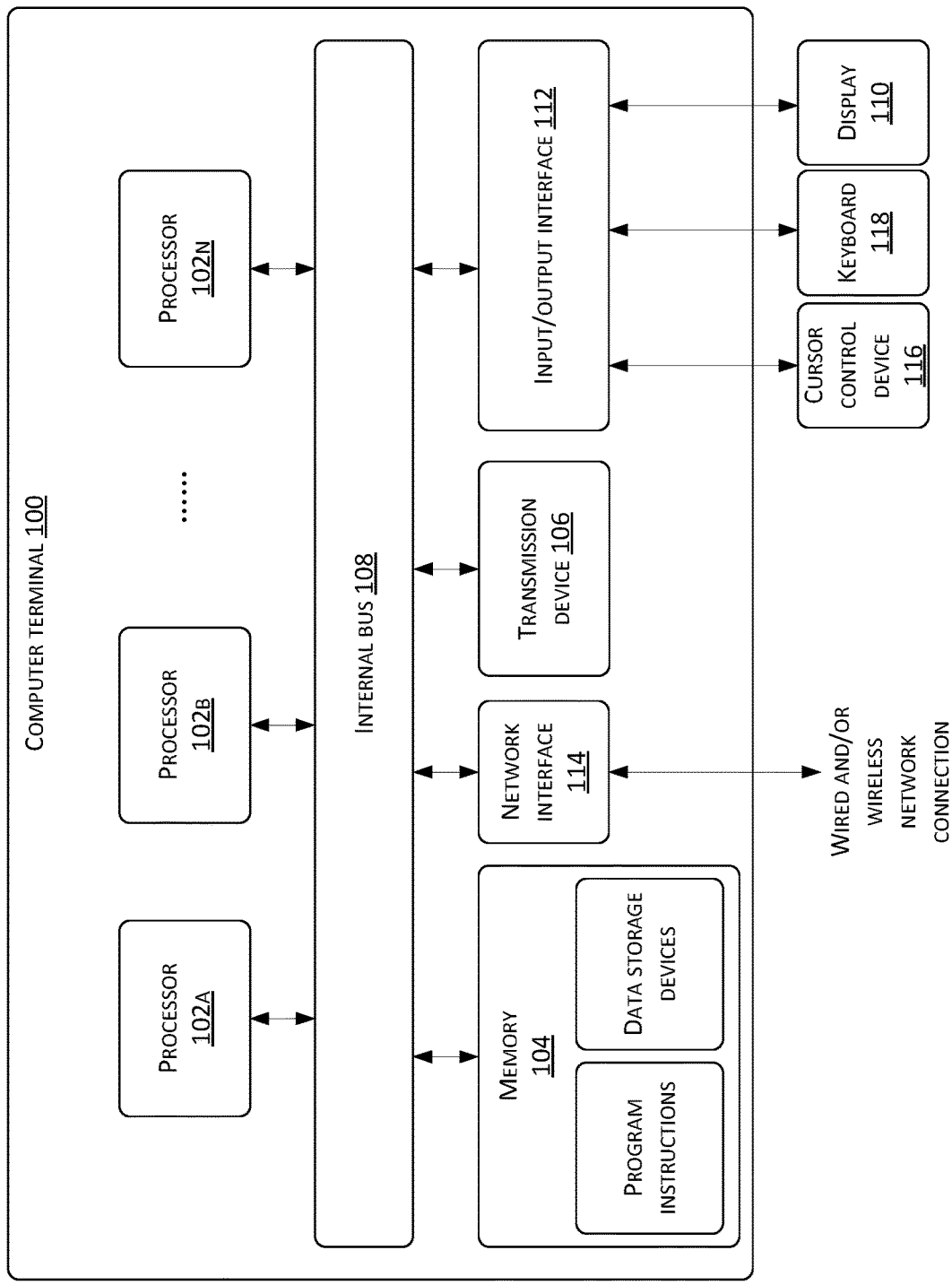
FIG. 1 is a block diagram showing a hardware structure of a computer terminal (or a mobile device) for implementing a measurement update method.

In order to enable one skilled in the art to readily understand the solutions of the present disclosure, the technical solutions of the present disclosure will be clearly and completely described hereinafter with reference to the drawings in the embodiments of the present disclosure. Apparently, the described embodiments merely represent a part and not all of the embodiments of the present disclosure. All other embodiments obtained by one of ordinary skill in the art based on the embodiments of the present disclosure without making any inventive effort fall within the scope of protection of the present disclosure.

It is to be understood that terms "first", "second" and the like in the specification and claims of the present disclosure are used to distinguish similar objects, and are not necessarily used to describe a particular order or sequence. It should be understood that data so used may be interchanged whenever appropriate, so that the embodiments of the present disclosure described herein can be implemented in an order other than those illustrated or described herein. In addition, terms "including", "having", and any variations thereof are intended to cover a non-exclusive inclusion. For example, a process, method, system, product, or device that includes a series of operations or units is not necessarily limited to those operations or units that are explicitly listed, and may include other operations or units that are not explicitly listed or that are inherent to such processes, methods, products, or devices.

First, some nouns or terms that appear in a process of describing the embodiments of the present application are applicable to the following explanations:

Trusted computing: Trusted Computing is a trusted computing platform supported by hardware security modules that are widely used in computing and communication systems to improve the overall security of the systems.

A measurement or a trusted measurement includes: calculating a measurement object using a predetermined algorithm, and comparing a calculation result with a pre-stored verification reference value, and determining that an integrity of the measurement object is not corrupted if a comparison result is consistent. For example, a practical method of a trusted measurement is an integrity measurement. The integrity measurement is to compare a hash value of the code calculated using a hash function with a stored hash value to find out whether the code has changed, and to make a corresponding determination by a system based on a comparison result, i.e., determining whether the code is corrupted.

TPM: TRM (Trusted Platform Module) security chip refers to a security chip that complies with a TPM (Trusted Platform Module) standard, and can effectively protect a PC and prevent unauthorized users from accessing thereto.

TPCM: Trusted Platform Control Module, a security chip that provides integrity and authenticity for evidence, and is generally physically bound to a computing platform.

Integrity measurement policy: A configuration of a measurement object and a measurement algorithm.

System integrity measurement policy: An algorithm/program configuration related to a system integrity measurement.

Measurement policy for hardware platform integrity: A measurement algorithm/measurement object configuration related to a hardware integrity measurement.

Integrity verification policy: A configuration of a measurement reference value.

System integrity verification policy: A reference value used for measuring integrity of an operating system kernel, a management configuration file, and a program file.

Hardware integrity verification policy: A reference value used for verifying an integrity of a hardware platform.

In accordance with the embodiments of the present disclosure, a method embodiment of a measurement update method is also provided. It should be noted that operations illustrated in a flowchart of an accompanying drawing may be performed in a computer system such as a set of computer executable instructions. Furthermore, although a logical order is shown in the flowchart, in some cases, the operations shown or described may be performed in a different order than the one described therein.

The method embodiment provided by the first embodiment of the present application can be executed in a mobile terminal, a computer terminal, or the like. FIG. 1 shows a block diagram of a hardware structure of a computer terminal (or a mobile device) used for implementing a measurement update method. As shown in FIG. 1, the computer terminal 100 (or the mobile device 100) may include one or more (as shown in the figure as 102a, 102b, . . . , 102n) processors 102 (the processors 102 may include, but are not limited to, a processing device such as a microprocessor MCU or a programmable logic device FPGA, etc.), a memory 104 used for storing data, and a transmission device 106 used for communication functions. In addition, the computer terminal 100 may further include an internal bus 108, a display 110, an input/output interface (I/O interface) 112, a universal serial bus (USB) port (which can be included as one of the ports of the I/O interface), a network interface 114, a cursor control device 116, a keyboard 118. In implementations, a power supply and/or a camera may also be included. One skilled in the art can understand that the structure shown in FIG. 1 is merely illustrative, and does not limit the structure of the above electronic device. For example, the computer terminal 100 may also include more or fewer components than those shown in FIG. 1, or have a configuration different from the one shown in FIG. 1.

It should be noted that one or more of the above-described processors 102 and/or other data processing circuits may be referred to herein generally as "data processing circuits". The data processing circuit may be embodied in whole or in part as software, hardware, firmware or any other combination thereof. Moreover, the data processing circuit may be a single and independent processing module, or incorporated in whole or in part into any of the other components in the computer terminal 100 (or the mobile device). As involved in the embodiments of the present application, the data processing circuit is used as a processor control (e.g., a selection of a variable resistance terminal path connected to the interface).

The memory 104 may be configured to store software programs and modules of application software, such as program instructions/data storage devices corresponding to the measurement update methods in the embodiments of the present disclosure. The processors 102 executes various functional applications and data processing by operating software programs and modules stored in the memory 104, i.e., the measurement update methods for implementing the above application programs. The memory 104 may include high speed random access memory, and may also include non-volatile memory such as one or more magnetic storage devices, flash memory, or other non-volatile solid state memory. In some instances, the memory 104 may further include storage devices remotely located relative to the processors 102. These remote storage devices may be coupled to the computer terminal 100 via a network. Examples of such network include, but are not limited to, the Internet, an intranet, a local area network, a mobile communication network, and a combination thereof.

The transmission device 106 is used for receiving or transmitting data via a network. Specific examples of the network may include a wireless network provided by a communication provider of the computer terminal 100. In an example, the transmission device 106 includes a Network Interface Controller (NIC) that can be connected to other network devices through a base station and thereby conduct communications with the Internet. In an example, the transmission device can be a Radio Frequency (RF) module used for communicating with the Internet wirelessly.

The display 110 may be, for example, a touch screen liquid crystal display (LCD) that enables a user to interact with a user interface of the computer terminal 100 (or the mobile device).

Based on the above problems in the related technologies, in current service environments, for example, in a cloud environment, a service party desires to have a fully autonomous control over integrity measurement policies, so that configurations and updates are flexible and convenient, and the continuity of services is ensured. For example, service requirements may include the following: (1) In a cloud service trusted environment, a integrity measurement policy and an integrity verification policy need to be consistent in real time to prevent system false positives. For example, an integrity measurement object changes or a measurement policy changes, but an integrity verification policy thereof is not updated, leading to a system false positive. (2) In the cloud environment, accurately identifying that updates of a measurement object and an integrity measurement policy are completed autonomously by the service party, rather than being tampered by malicious attacks, can be made. The former needs to ensure that an integrity verification policy is also updated in real time, and the latter needs to identify an attack and prohibit an update to the integrity measurement policy.

Based on the foregoing service requirements, the embodiments of the present disclosure provides a method for implementing a trusted policy update risk control based on an audit data analysis of software and hardware, a method for identifying legitimacy of a trusted policy update subject, a method of real-time consistency of an integrity verification policy and a measurement policy, and corresponding processes, systems, and devices for performing the above methods. Descriptions are respectively given as follows.

Figure 2:
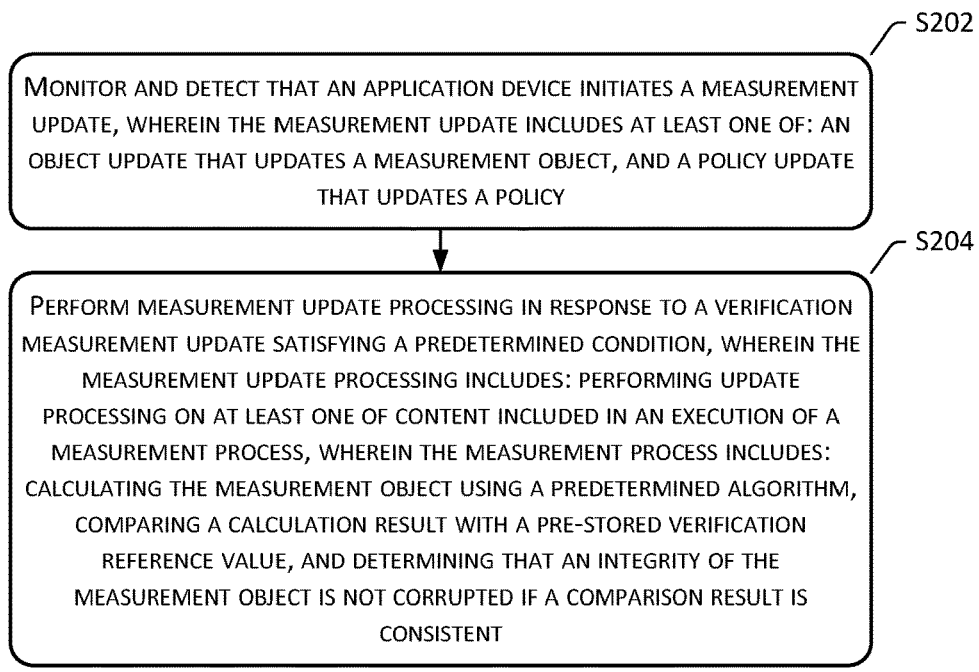
FIG. 2 is a flowchart of a measurement update method according to the first embodiment of the present disclosure.

In the above operating environment, the present application provides a measurement update method as shown in FIG. 2. FIG. 2 is a flowchart of a measurement update method 200 according to the first embodiment of the present disclosure.

Operation S202: Monitor and detect that an application device initiates a measurement update, wherein the measurement update includes at least one of: an object update that updates a measurement object, and a policy update that updates a policy.

Operation S204: Perform measurement update processing in response to a verification measurement update satisfying a predetermined condition, wherein the measurement update processing includes: performing update processing on at least one of content included in an execution of a measurement process, wherein the measurement process includes: calculating the measurement object using a predetermined algorithm, comparing a calculation result with a pre-stored verification reference value, and determining that an integrity of the measurement object is not corrupted if a comparison result is consistent.

Through the above operations, by using an application device to actively update a measurement that needs to be updated, and detecting that the measurement is updated by the application device, measurement update processing is performed upon verifying that a measurement update satisfies a predetermined condition, thus achieving the purpose of actively updating the measurement object, a measurement policy, and a corresponding verification policy by a service party (i.e., the application device). This thereby realizes the technical effects of updating content of the measurement object and the measurement policy that need to be updated in time, and hence solving the technical problems of the related technologies that a service party fails to actively update a policy in time, a process of updating configurations is cumbersome, and the continuity of a service cannot be guaranteed.

In implementations, an execution entity of the foregoing measurement update method may be a measurement update monitoring component (which may be referred to as a trusted measurement object and a trusted measurement policy operation monitoring component hereinafter, i.e., a component, and functions thereof are real-time monitoring updates of a trusted measurement object (the measurement object as described above) and trusted measurement policies (a measurement policy and a verification policy included above or below) to ensure correct and legitimate changes to the measurement object and the measurement policies, and ensure that the consistency of the measurement policy and the verification policy remain consistent in real time, thereby reducing the existence of attacks and system false positives. The measurement update monitoring component may be a brand new component or a functional component attached to an existing functional entity device.

In implementations, the foregoing measurement update processing may include: performing update processing on at least one of content included in the process of performing the measurement, wherein the content included in the execution of the measurement process includes: an executed subject (for example, a measurement object) in the execution of the measurement process, a measurement method (for example, a measurement policy) used in the execution of the measurement process; and may also include a verification method for verifying a measurement result (for example, a verification policy for verifying the measurement result) after a measurement is performed. It should be noted that the content included in the execution of the measurement process listed above is only some of the examples, as long as other content involved in the execution of the measurement process belongs to the measurement update processing that is referred to in the present application, which are not exhaustively listed herein.

Figure 3:
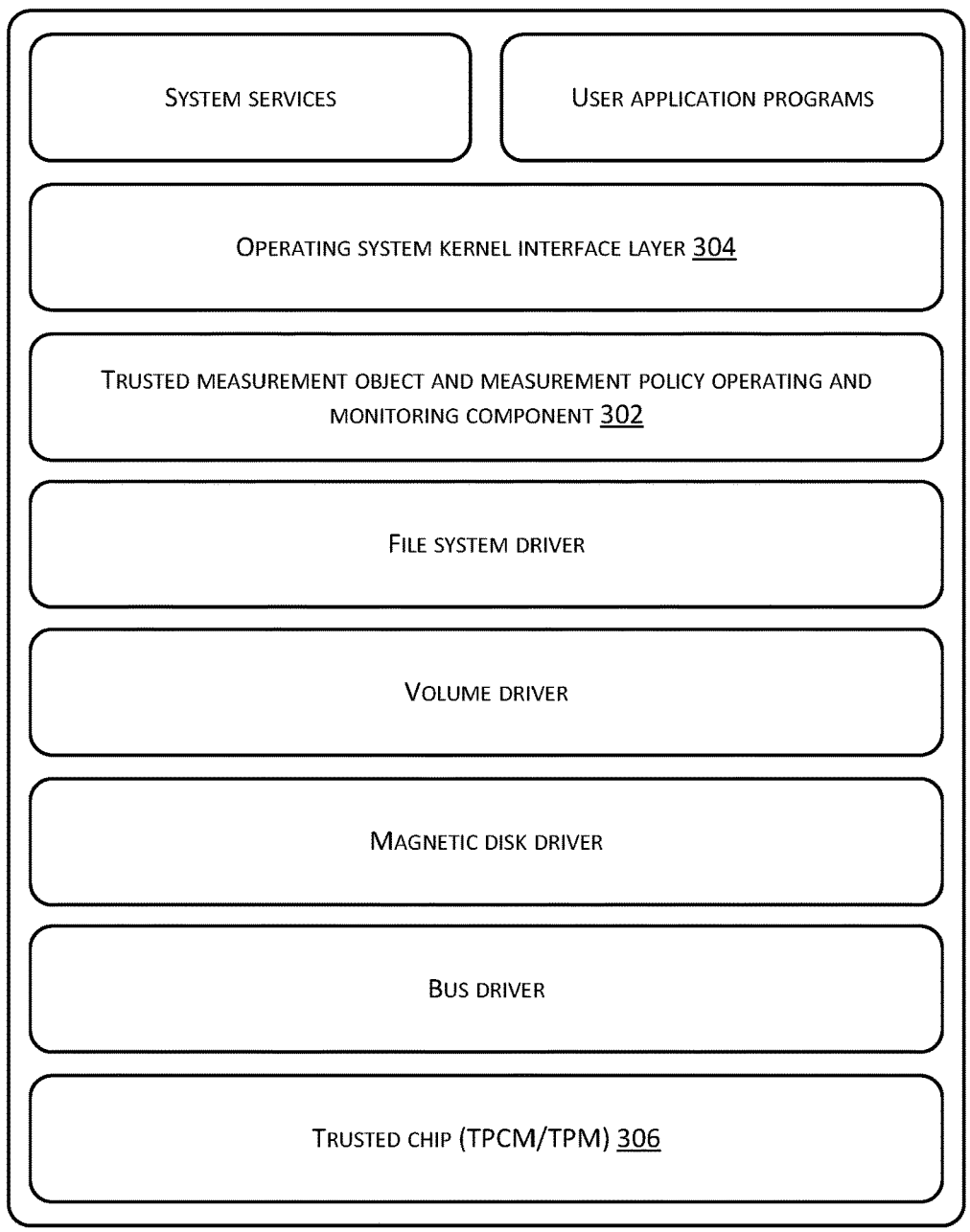
FIG. 3 is a system architecture diagram of a trusted measurement policy update according to the embodiments of the present disclosure.

FIG. 3 is a system architecture diagram of a trusted measurement policy update 300 according to the embodiments of the present disclosure. For example, a "trusted measurement object and measurement policy operating and monitoring component" 302 may be added to a kernel layer 304 of an operating system of a host machine of a TPCM or TPM trusted chip 306. This component 302 is configured to sense operations of all measurement objects and to intercept operational activities of all programs on trusted measurements. As shown in FIG. 3, the trusted policy control system includes three main entities: a privileged user (hereinafter referred to as C) of a service party, a measurement object and measurement policy monitoring component that is loaded on a service server (hereinafter referred to as A), and a policy control center (which is subsequently referred to as S).

In implementations, a measurement update initiated by that an application device that is monitored and detected by the measurement update monitoring component may be a local measurement update that has been performed by the application device, for example, a local measurement object that has been updated, a local policy that has been updated, or a local measurement that has been updated. A measurement update initiated by that an application device that is monitored and detected by the measurement update monitoring component may also be a local measurement update that has not been performed by the application device, and a measurement update request is initiated to perform the measurement update.

In implementations, the object update that updates the measurement object may include an update to the measurement object itself, and an update to a measurement policy involved in the measurement object after updating the measurement itself, and may further include an update to a verification policy corresponding to the measurement policy.

In implementations, updating the policy may include updating the measurement policy itself, or may also include updating the verification policy corresponding to the measurement policy.

In implementations, the foregoing predetermined condition may include content of multiple aspects, for example, may be for a measurement object related to the measurement update, for example, whether a subject of the measurement is legitimate, and whether the measurement is eligible for the update; and may also be measurement content related to the measurement update, for example, a version level requested for the measurement update, whether content of the measurement update that is requested exists, etc.

In implementations, performing the measurement update processing may be implemented in various manners. For example, at least one of the following manners may be implemented. One is to have the measurement update monitoring component to perform the measurement update processing, and perform synchronization with the policy control center after the update processing is completed, i.e., the measurement update monitoring component performs the measurement update processing locally, and synchronizes updated content with the policy control center after the measurement update processing is completed, thereby achieving consistency of the update. Another one is to have the measurement update monitoring component to initiate an update request to the policy control center, and the policy control center to complete the measurement update processing for the application device, i.e., the measurement update monitoring component does not perform the measurement update processing locally, but the measurement update monitoring component initiates an update request to the policy control center, and the policy control center performs corresponding measurement update processing, and after the measurement update processing is finished, synchronously and completely performs the corresponding measurement update processing for the measurement update monitoring component. These two types of measurement update methods are respectively described hereinafter according to content of measurement updates.

In implementations, when the measurement update is an object update, the measurement update monitoring component performing the measurement update processing and performing the synchronization with the policy control center after the update processing is completed may include: the measurement update monitoring component updating a locally stored measurement object to a new measurement object content, and returning a feedback about a completion of the measurement object update to the application device, and synchronizing the new measurement object content with the policy control center, i.e., by the measurement update monitoring component locally performing the measurement update, and an update of the measurement object in the measurement update of the entire measurement update system is implemented. The measurement update monitoring component initiating the update request to the policy control center, and the policy control center completing the measurement update processing for the application device include: the measurement update monitoring component determining a new measurement object content, and after signing the update request including the new measurement object content using a private key of the measurement update monitoring component, sending the signed update request to the policy control center; and the policy control center controlling a local update to store the new measurement object content, and controlling the measurement update monitoring component to store the new measurement object content. Specifically, by using the policy control center to perform a measurement update, an update of a measurement object in the measurement update of the entire measurement update system is implemented.

In implementations, after the measurement update monitoring component signs the update request including the new measurement object content using the private key of the measurement update monitoring component, sending the signed update request to the policy control center may include: the measurement update monitoring component performing a hash calculation on the new measurement object content to obtain a hash value for the new measurement object content; and after signing the hash value using the private key of the measurement update monitoring component, sending the signed hash value to the policy control center. By sending the new measurement object content through the hash value obtained by the hash calculation, the update request does not need to include the new measurement object content itself, which is beneficial to improving the efficiency of data transmission.

In implementations, when the measurement update is a policy update, and before performing the measurement update processing, the method further includes: determining an operation feature of an operation performed on a policy file when a policy is updated; and when determining that the operation feature is a write operation performed on the policy file and a write instruction inputted in the application device is legitimate, allowing the measurement update processing to be performed by the write operation on the policy file. By verifying the legitimacy of the write instruction, the protection of the policy update against abnormal attacks can be effectively implemented.

Correspondingly, in implementations, when the measurement update is a policy update, the measurement update monitoring component performs the measurement update processing. After the update processing is completed, performing the synchronization with the policy control center may include: the measurement update monitoring component updating a locally stored policy file to a new policy file through a write operation on the policy file, returning a feedback about an update completion of the policy file to the application device, and synchronizing the new policy file with the policy control center. Specifically, by using the measurement update monitoring component to perform measurement updates locally, updates to policies in the measurement updates for the entire measurements update system are achieved. The measurement update monitoring component initiating an update request to the policy control center, and the policy control center completing the measurement update processing for the application device may include: the measurement update monitoring component determining a new policy file, and signing the update request that includes the new policy file using the private key of the measurement update monitoring component, and sending the signed update request to the policy control center, and the policy control center controlling to store the new policy file locally and controlling the measurement update monitoring component to store the new policy file. Specifically, by using the policy control center to perform the measurement update, the update of the policy in the measurement update of the entire measurement update system is implemented.

It should be noted that the new measurement object content obtained by updating the measurement object may include: a new measurement object, a new measurement policy for measuring the new measurement object, and a new verification policy corresponding to the new measurement policy. The new policy file obtained by updating the policy corresponding to the policy may include: a new measurement policy file, and a new verification file corresponding to the new measurement policy file.

Based on the system architecture of the above-mentioned trusted measurement policy update, in an exemplary embodiment of the present disclosure, a measurement update method applied at a policy measurement object monitoring agent (a functional entity that is included in the measurement update monitoring component and used for updating measurement objects) is also provided. A measurement update method applied at a policy measurement file monitoring agent (a functional entity that is included in the measurement update monitoring component and used for updating measurement policies) is also provided.

It should be noted that the following assumptions need to be initialized before the measurement update method applied at the policy measurement object monitoring agent and the measurement update method applied at the policy measurement file monitoring agent are described:

First assumption: C, A, and S have obtained respective platform certificates Cert_AIK$_C$, Cert_AIK$_A$, and Cert_AIK from a platform certificate authority (hereinafter referred to as PCA) of a service server cluster, wherein respective platform public keys are AIK$_{pk\_C}$, AIK$_{pk\_A}$, and AIK$_{pk\_S}$; respective platform private keys AIK$_{priv\_C}$, AIK$_{priv\_A}$, and AIK$_{priv\_S}$ are stored in respective TPM/TPCM chips. PCA also has its own platform identity certificate Cert_AIKPCA, and platform identity public and private keys, AIK$_{pk\_PCA}$ and AIK$_{priv\_PCA}$. C, A, and S can obtain corresponding platform identity public keys and platform certificates of objects that they desire to communicate from the platform certificate authority PCA.

Second assumption: C has completed an initial registration with S, and becomes a legitimate user, having a corresponding privileged password; C submits a list of objects to be measured, i.e., an initial measurement policy; S configures a verification policy according to an initial measurement policy, and synchronizes the initial measurement policy with the policy monitoring agent A.

In addition, the following points need to be explained:
(1) A trusted policy refers to an integrity measurement policy and an integrity verification policy;
(2) The integrity measurement policy includes an integrity measurement policy of a system and a hardware platform;
(3) The integrity verification policy includes an integrity verification policy of the system and the hardware platform;
(4) C can update a measurement object if a condition is met; A can dynamically monitor updates of measurement objects and measurement policies, and send a for a measurement policy and verification policy update request to S when certain conditions are met. When certain conditions are met, A responds to the measurement policy and verification policy update request of S, and updates a measurement policy and a verification policy of a service party. In an exemplary solution, for existing measurement policies and verification policies, A can respond and update a measurement policy and a verification policy in time, and then synchronize thereof with the policy control center. A measurement policy of which a password is met but certain conditions are not met is sent to the policy control center, and the policy control center performs a real-time update of the measurement policy and a verification policy;
(5) Interactive authentication and sensitive information of C, A, and S is guaranteed through a certificate and an encryption and decryption principle of public and private keys.

Figure 4:
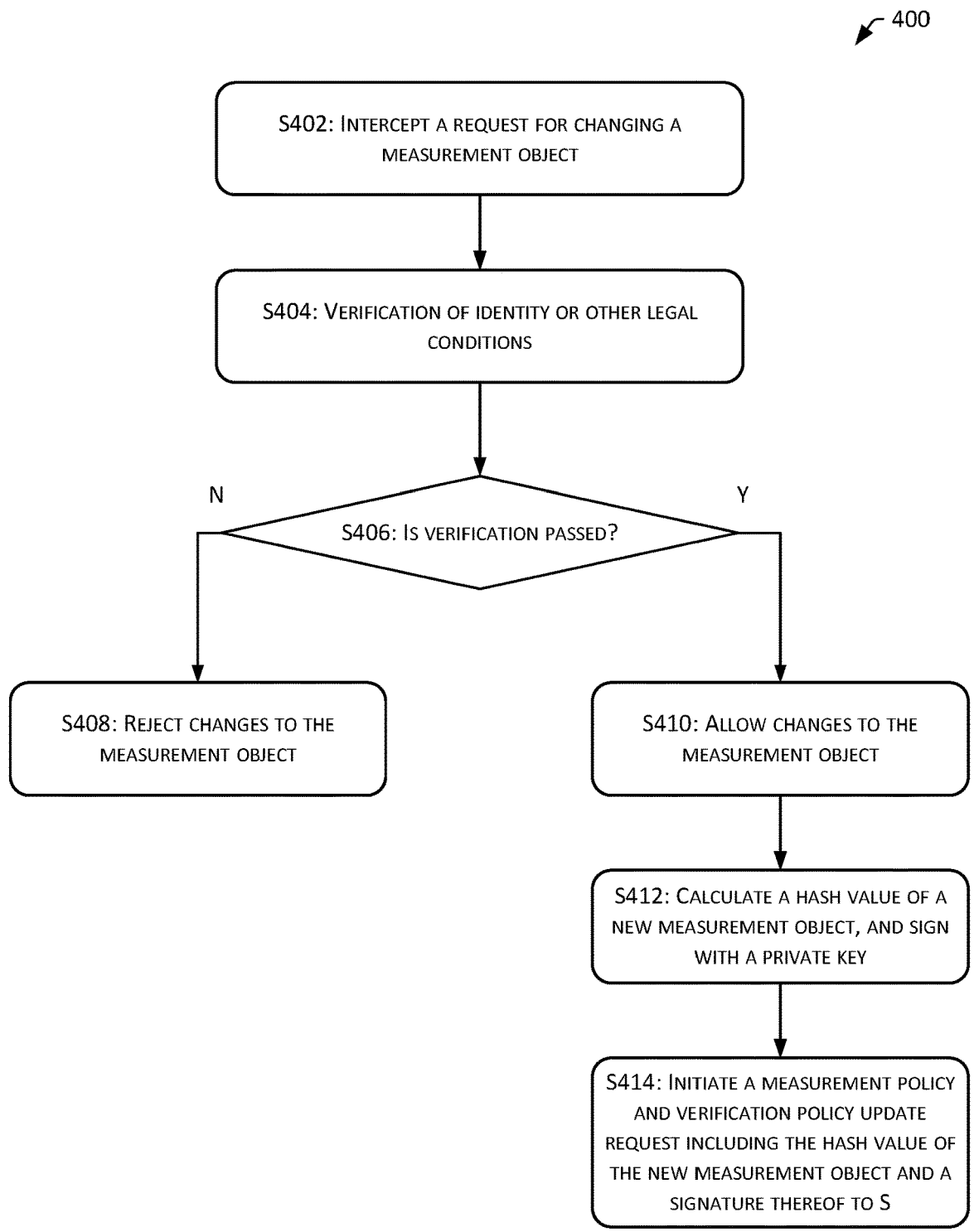
FIG. 4 is a flowchart of a measurement update method at a policy measurement object monitoring agent according to the embodiments of the present disclosure.

FIG. 4 is a flowchart of a measurement update method 400 applied at a policy measurement object monitoring agent according to the embodiments of the present disclosure. As shown in FIG. 4, the method 400 is described as follows:
S402: A intercepts a request for changing a measurement object;
S404: Verification about whether the identity of C is legitimate, or whether other conditions for a change to the measurement object are satisfied is performed. For example, whether a version of the measurement object is lower than a current version, or whether a high version exists, etc;
S406: If the verification fails, operation S408 is performed; if the verification is successful, operation S410 is performed;
S408: The change to the measurement object is rejected;
S410: The change to the measurement object is allowed;
S412: A hash value of a new measurement object is calculated, and signed using the platform identity private key of A;
S414: A measurement policy and verification policy update request including the hash value of the new measurement object and a signature thereof is initiated to S.

Figure 5:
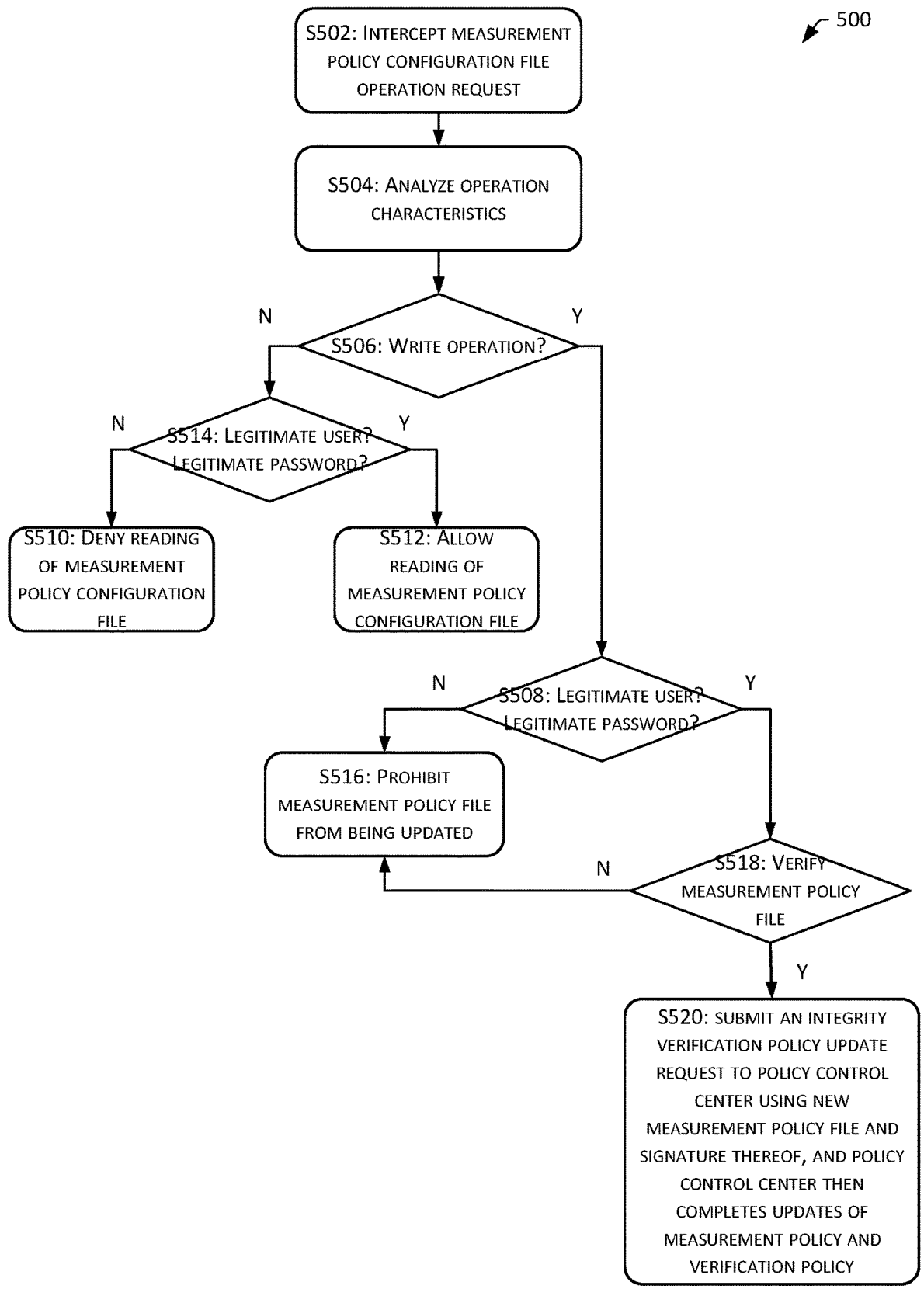
FIG. 5 is a flowchart of a measurement update method at a policy measurement policy file monitoring agent according to the embodiments of the present disclosure.

FIG. 5 is a flowchart of a measurement update method 500 applied at a policy measurement policy file monitoring agent according to the embodiments of the present disclosure. As shown in FIG. 5, the method 500 is described as follows:
S502: A intercepts an operation request for a measurement policy file;
S504: Operational characteristics are analyzed;
S506: Is it a write operation? If affirmative, operation S508 is performed, or operation S514 is performed otherwise;
S508: Is a legitimate user and is a legitimate password entered? Operation S518 is performed if affirmative, or operation S516 is performed otherwise;
S510: The measurement policy file is denied to be read;
S512: The measurement policy file is allowed to be read;
S514: Is a legitimate user and is a legitimate password entered? Operation S512 is performed if affirmative, or operation S510 is performed otherwise;
S516: The measurement policy file is prohibited from being updated;
S518: Is verification of the measurement policy file passed? If affirmative, operation S520 is performed, or operation S516 is performed otherwise;

S520: A measurement policy and verification policy update request including an encrypted measurement policy file and a signature thereof is initiated to S.

Through the embodiments of the present disclosure, a trusted measurement object and trusted measurement policy operation monitoring component monitors updates of trusted measurement objects and trusted measurement policies in real time to ensure correct and legitimate changes of the measurement objects and the measurement policies, and measurement policies to remain consistent with corresponding verification policies in real time, thereby reducing the existence of attacks and system false positives. For example, in a cloud service trusted environment, updates of an integrity measurement policy and an integrity verification policy update can ensure two-way real-time consistency. The legitimacy of a subject of a policy update can be accurately identified. A service party server has a full autonomic control over integrity measurement policies, having simple configuration and update processes, and effectively ensuring the continuity of services.

Second Embodiment

Figure 6:
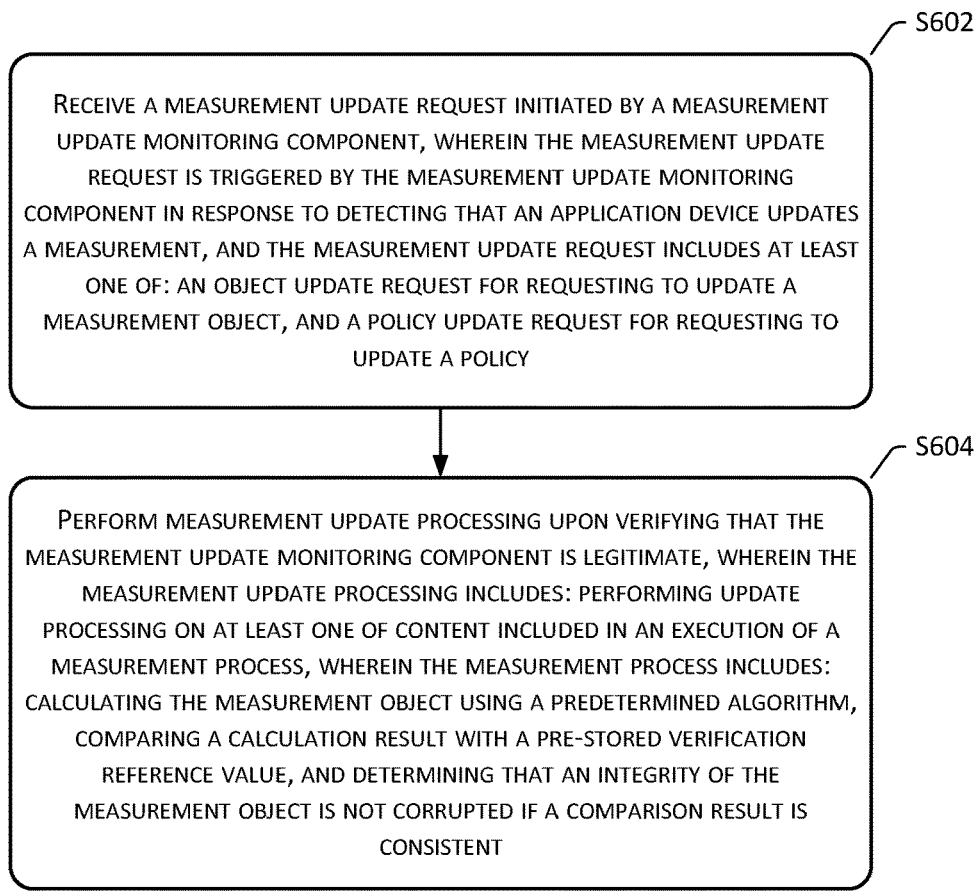
FIG. 6 is a flowchart of a measurement update method according to the second embodiment of the present disclosure.

The present application provides a measurement update method 600 as shown in FIG. 6. FIG. 6 is a flow chart of a measurement update method 600 according to the second embodiment of the present disclosure. As shown in FIG. 6, the measurement update method 600 includes:

Operation S602: Receive a measurement update request initiated by a measurement update monitoring component, wherein the measurement update request is triggered by the measurement update monitoring component in response to detecting that an application device updates a measurement, and the measurement update request includes at least one of: an object update request for requesting to update a measurement object, and a policy update request for requesting to update a policy.

Operation S604: Perform measurement update processing upon verifying that the measurement update monitoring component is legitimate, wherein the measurement update processing includes: performing update processing on at least one of content included in an execution of a measurement process, wherein the measurement process includes: calculating the measurement object using a predetermined algorithm, comparing a calculation result with a pre-stored verification reference value, and determining that an integrity of the measurement object is not corrupted if a comparison result is consistent.

Through the above operations, by using an application device to actively update a measurement that needs to be updated, and detecting that the measurement is updated by the application device, measurement update processing is performed upon verifying that a measurement update satisfies a predetermined condition, thus achieving the purpose of actively updating the measurement object, a measurement policy, and a corresponding verification policy by a service party. This thereby realizes the technical effects of updating content of the measurement object and the measurement policy that need to be updated in time, and hence solving the technical problems of the related technologies that a service party fails to actively update a policy in time, a process of updating configurations is cumbersome, and the continuity of a service cannot be guaranteed.

In implementations, an execution entity of the above measurement update method may be a policy control center. The policy control center is configured to respond to a request for updating a measurement object, a request for updating a measurement policy, and a request for updating a verification policy, and update measurement object(s), and measurement polic(ies), and the verification polic(ies) of service part(ies).

In implementations, corresponding to a measurement update performed by the measurement update monitoring component, performing the measurement update processing may include:

under a circumstance that measurement update request includes a new measurement object content obtained by the measurement update monitoring component that has completed an update of a measurement object, and/or a new policy file obtained by the measurement update monitoring component that has completed an update of a policy file corresponding to a policy, performing a synchronization of the new measurement object content and/or the new policy file through a method of synchronization operations performed by the policy control center and the measurement update monitoring component; and under a circumstance that measurement update request does not include a new measurement object content obtained by the measurement update monitoring component that has completed an update of a measurement object, and/or a new policy file obtained by the measurement update monitoring component that has completed an update of a policy file corresponding to a policy, the policy control center performing the update of the measurement object and/or the update of the policy file, and storing the new measurement object content and/or the new policy file in the policy control center and the measurement update monitoring component.

In implementations, before performing the synchronization of the new measurement object content and/or the new policy file, the method further includes: verifying the new measurement object content and/or the new policy file, and triggering the synchronization of new measurement object content and/or new policy files upon successful verification.

In implementations, receiving the measurement update request sent by the measurement update monitoring component includes receiving an update request signed by the private key of the measurement update monitoring component.

It should be noted that the new measurement object content obtained by updating the measurement object may include: a new measurement object, a new measurement policy for measuring the new measurement object, and a new verification policy corresponding to the new measurement policy. The new policy file obtained by updating the policy corresponding to the policy may include: a new measurement policy file and a new verification file corresponding to the new measurement policy file.

Figure 7:
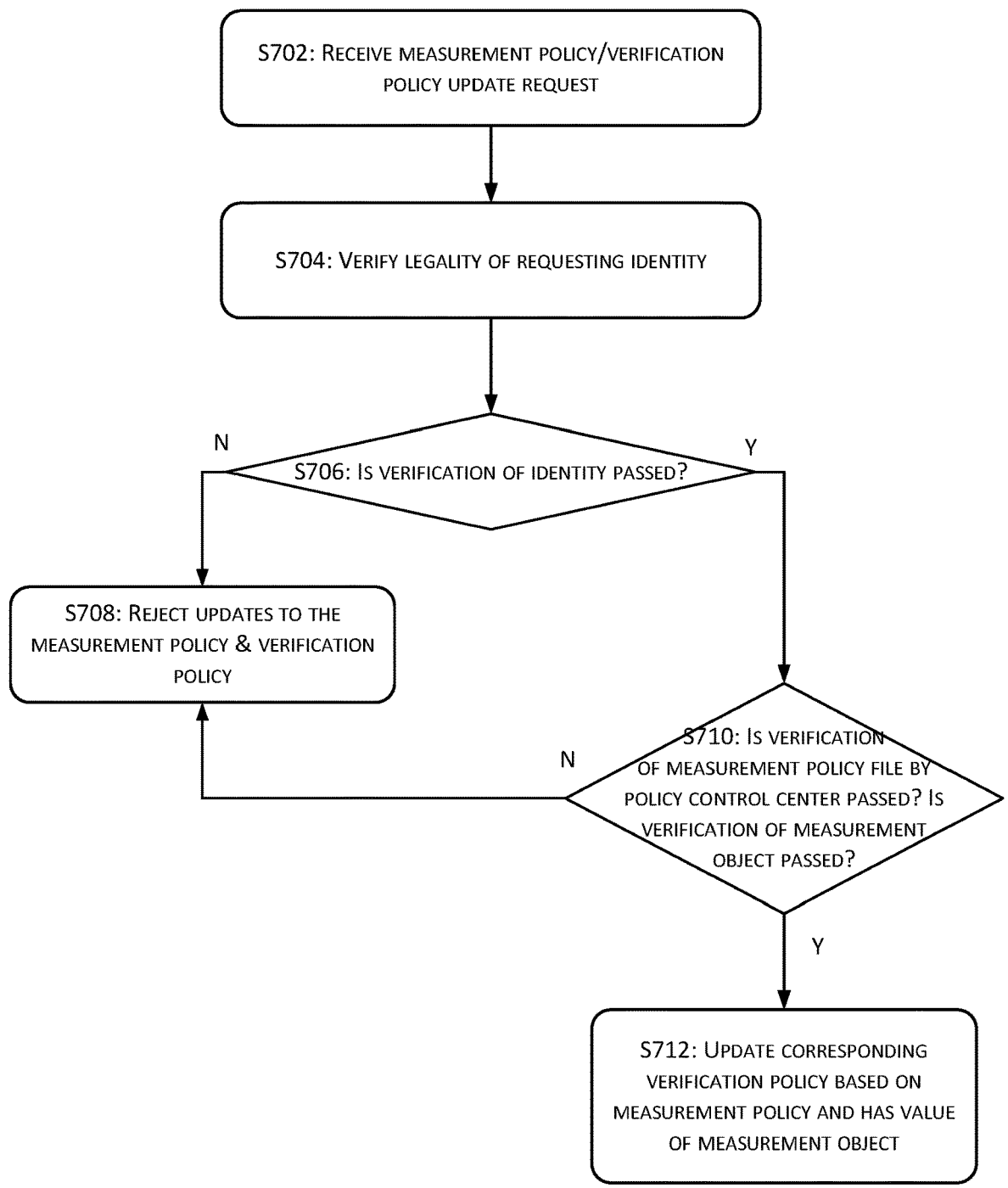
FIG. 7 is a flowchart of a measurement update method at a policy control center according to the embodiments of the present disclosure.

Correspondingly, based on the system architecture of the above-mentioned trusted measurement policy update, in an exemplary embodiment of the present disclosure, a policy control center is provided (i.e., the policy control center described above). FIG. 7 is a flowchart of a measurement update method applied at the policy control center according to the embodiments of the present disclosure. As shown in FIG. 7, the measurement update method 700 includes:

S702: S receives a request for updating a measurement policy from A, or receives a ciphertext including a hash value of a measurement object and a signature of A and a request for updating a verification policy;

S704: Legitimate verification is performed on an identity of A;

S706: Is the verification of the identity passed? If affirmative, operation S710 is performed, or operation S708 is performed otherwise;

S708: Updates to the measurement policy and the verification policy are blocked;

S710: Is verification of a measurement policy file and a hash of the measurement object by S successful? If affirmative, operation S712 is performed, or operation S708 is performed otherwise;

S712: The corresponding measurement policy and the corresponding verification policy are updated according to the measurement policy file and the hash value of the measurement object.

Through the foregoing embodiments and the exemplary embodiments, the trusted measurement object and trusted measurement policy operation monitoring component monitors updates of trusted measurement objects and trusted measurement policies in real time, and then implement updates of corresponding measurement objects, measurement policies, and verification policies based on the policy control center, to ensure that the measurement objects and the measurement policies are correctly and legally changed, and the measurement policies and the verification policies are kept consistent in real time, thereby reducing the existence of attacks and system false positives.

Third Embodiment

Figure 8:
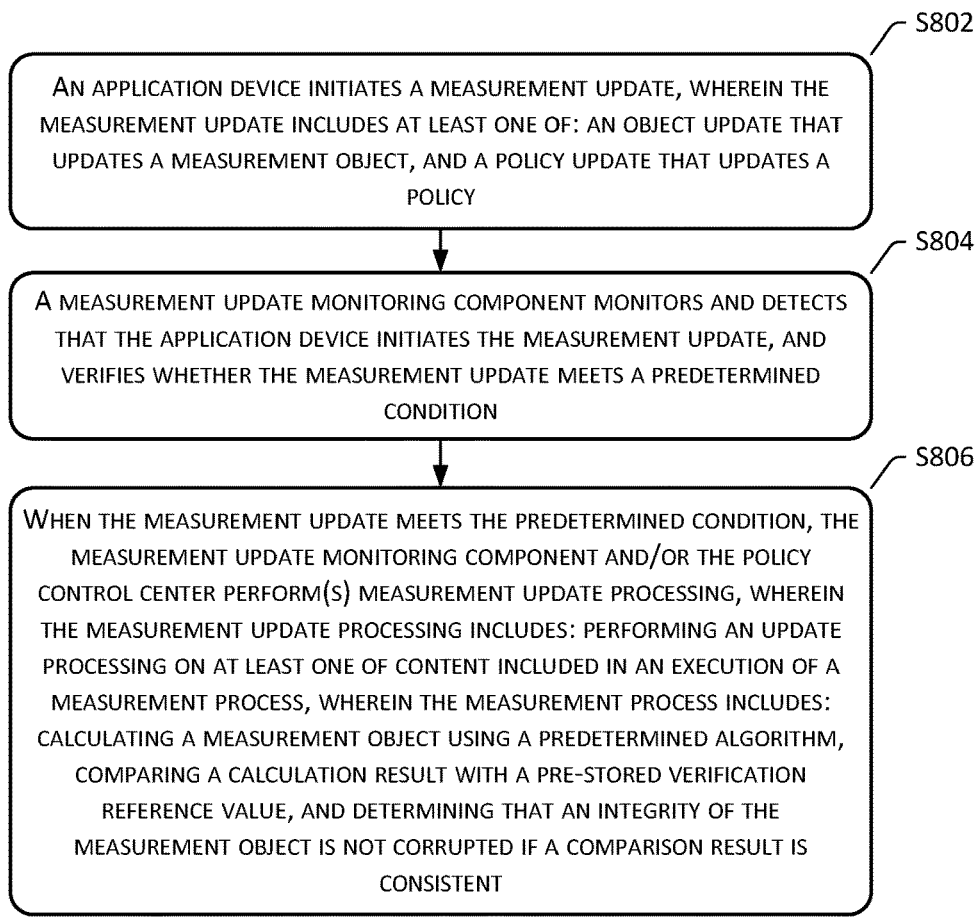
FIG. 8 is a flowchart of a measurement update method according to the third embodiment of the present disclosure.

The present application provides a measurement update method 800 as shown in FIG. 8. FIG. 8 is a flowchart of a measurement update method 800 according to the third embodiment of the present disclosure. As shown in FIG. 8, the measurement update method 800 may include the following.

Operation S802: An application device initiates a measurement update, wherein the measurement update includes at least one of: an object update that updates a measurement object, and a policy update that updates a policy.

Operation S804: A measurement update monitoring component monitors and detects that the application device initiates the measurement update, and verifies whether the measurement update meets a predetermined condition.

Operation S806: When the measurement update meets the predetermined condition, the measurement update monitoring component and/or the policy control center perform(s) measurement update processing, wherein the measurement update processing includes: performing an update processing on at least one of content included in an execution of a measurement process, wherein the measurement process includes: calculating a measurement object using a predetermined algorithm, comparing a calculation result with a pre-stored verification reference value, and determining that an integrity of the measurement object is not corrupted if a comparison result is consistent.

Through the above operations, by using an application device to actively update a measurement that needs to be updated, and detecting that the measurement is updated by the application device, measurement update processing is performed upon verifying that a measurement update satisfies a predetermined condition, thus achieving the purpose of actively updating the measurement object, a measurement policy, and a corresponding verification policy by a service party. This thereby realizes the technical effects of updating content of the measurement object and the measurement policy that need to be updated in time, and hence solving the technical problems of the related technologies that a service party fails to actively update a policy in time, a process of updating configurations is cumbersome, and the continuity of a service cannot be guaranteed.

In implementations, the measurement update monitoring component verifying whether the measurement update meets the predetermined condition includes at least one of: the measurement update monitoring component verifying whether the application device that initiates the measurement update is a legitimate party; the measurement update monitoring component verifying whether updated version(s) of the measurement object and/or the policy is/are higher than existing version(s); the measurement update monitoring component verifying whether a measurement object and/or a policy higher than existing version(s) exist(s).

In implementations, the measurement update monitoring component and/or the policy control center performing the measurement update processing includes:

when the measurement update monitoring component stores the measurement object and/or the policy locally, the measurement update monitoring component updating the measurement object to obtain an updated measurement object, and/or updating a policy file corresponding to the policy to obtain an updated policy file, and synchronizing the updated measurement object and the updated policy file to the policy control center by performing a synchronization operation with the policy control center;

when the measurement update monitoring component does not store the measurement object and/or the policy locally, the measurement update monitoring component determining a new measurement object content and/or a new policy file, and after signing an update request including the new measurement object content and/or the new policy file using a private key of the measurement update monitoring component, sending thereof to the policy control center, and the policy control center controlling to locally update and store the new measurement object content and/or the new policy file, and controlling the measurement update monitoring component to store the new measurement object content and/or the new policy file.

In implementations, the measurement update monitoring component sending the update request including the new measurement object content to the policy control center may include:

the measurement update monitoring component performing a hash calculation on the new measurement object content to obtain a hash value; and the measurement update monitoring component signing the hash value using the private key of the measurement update monitoring component and sending thereof to the policy control center.

In implementations, the policy control center performing the measurement update processing includes:

the policy control center performing verification on the new measurement object content and/or the new policy file, and updating a locally stored measurement object to the new measurement object content and/or updating a locally stored policy file to a new policy file if the verification is passed, and sending the new measurement object content and/or the new policy file to the measurements update monitoring component for update and storage.

It should be noted that the new measurement object content obtained by updating the measurement object may include: a new measurement object, a new measurement policy for measuring the new measurement object, and a new verification policy corresponding to the new measurement policy. The new policy file obtained by updating the policy corresponding to the policy may include: a new measurement policy file and a new verification file corresponding to the new measurement policy file.

It should be noted that, for the sake of simple description, the foregoing method embodiments are all expressed as a series of action combinations. However, one skilled in the art should understand that the present disclosure is not limited by the described orders of actions because certain operations may be performed in other orders or in parallel in accordance with the present disclosure. In addition, one skilled in the art should also understand that the embodiments described in the specification are all exemplary embodiments, and actions and modules involved may not be necessarily needed by the present disclosure.

Through the description of the above embodiments, one skilled in the art can clearly understand that the methods according to the above embodiments can be implemented by means of software plus a necessary general hardware platform, and apparently may also be implemented by hardware. However, in many cases, the former is a better implementation. Based on such understanding, the essence of the technical solutions of the present disclosure or the portions that make contributions to existing technologies may be embodied in a form of a software product stored in a storage medium (such as a ROM/RAM, disk, a magnetic disk, an optical disk), and includes a number of instructions to cause a terminal device (which may be a cell phone, a computer, a server, or a network device, etc.) to perform the methods of various embodiments of the present disclosure.

Fourth Embodiment

Figure 9:
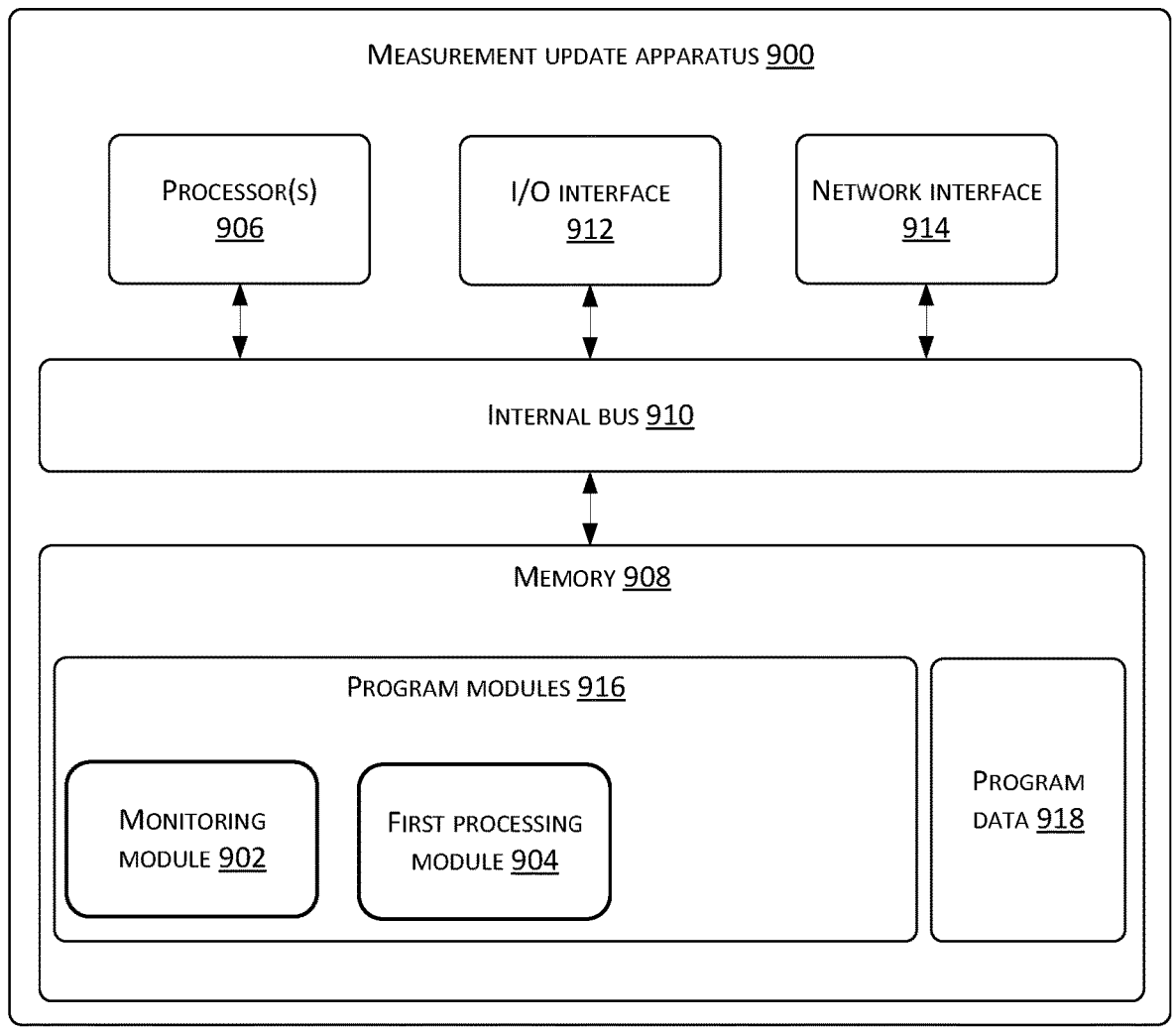
FIG. 9 is a schematic structural diagram of a measurement updating apparatus according to the fourth embodiment of the present disclosure.

According to the embodiments of the present disclosure, a measurement update apparatus 900 for implementing the measurement update method as shown in the first embodiment is further provided. FIG. 9 is a schematic structural diagram of a measurement update apparatus 900 according to the fourth embodiment of the present disclosure. As shown in FIG. 9, the apparatus 900 can be applied in a measurement update monitoring component, and includes a monitoring module 902 and a first processing module 904, which are described below.

The monitoring module 902 is configured to monitor and detect that an application device initiates a measurement update, wherein the measurement update includes at least one of: an object update that updates a measurement object, and a policy update that updates a policy.

The first processing module 904 is connected to the monitoring module 902, and is configured to perform measurement update processing upon verifying that the measurement update meets a predetermined condition, wherein the measurement update processing includes: performing update processing on at least one of content included in an execution of a measurement process, wherein the measurement process includes: calculating the measurement object using a predetermined algorithm, comparing a calculation result with a pre-stored verification reference value, and determining that an integrity of the measurement object is not corrupted if a comparison result is consistent.

In implementations, the apparatus 900 may further include one or more processors 906, a memory 908, and an internal bus 910. In implementations, the apparatus 900 may further include an input/output (I/O) interface 912, and a network interface 914.

The memory 908 may include a form of processor readable media such as a volatile memory, a random access memory (RAM) and/or a non-volatile memory, for example, a read-only memory (ROM) or a flash RAM. The memory 908 is an example of a processor readable media.

The processor readable media may include a volatile or non-volatile type, a removable or non-removable media, which may achieve storage of information using any method or technology. The information may include a processor-readable instruction, a data structure, a program module or other data. Examples of processor storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the processor readable media does not include transitory media, such as modulated data signals and carrier waves.

In implementations, the memory 908 may include program modules 916 and program data 918. The program modules 916 may include one or more modules as described in the foregoing description and shown in FIG. 9.

It should be noted that the monitoring module 902 and the first processing module 904 correspond to operations S202 to S204 in the first embodiment. Examples and application scenarios implemented by these two modules and corresponding operations are the same, but are not limited to the above content described in the first embodiment. It should be noted that the above modules can be operated as a part of the apparatus in the computer terminal 100 provided in the first embodiment.

Fifth Embodiment

Figure 10:
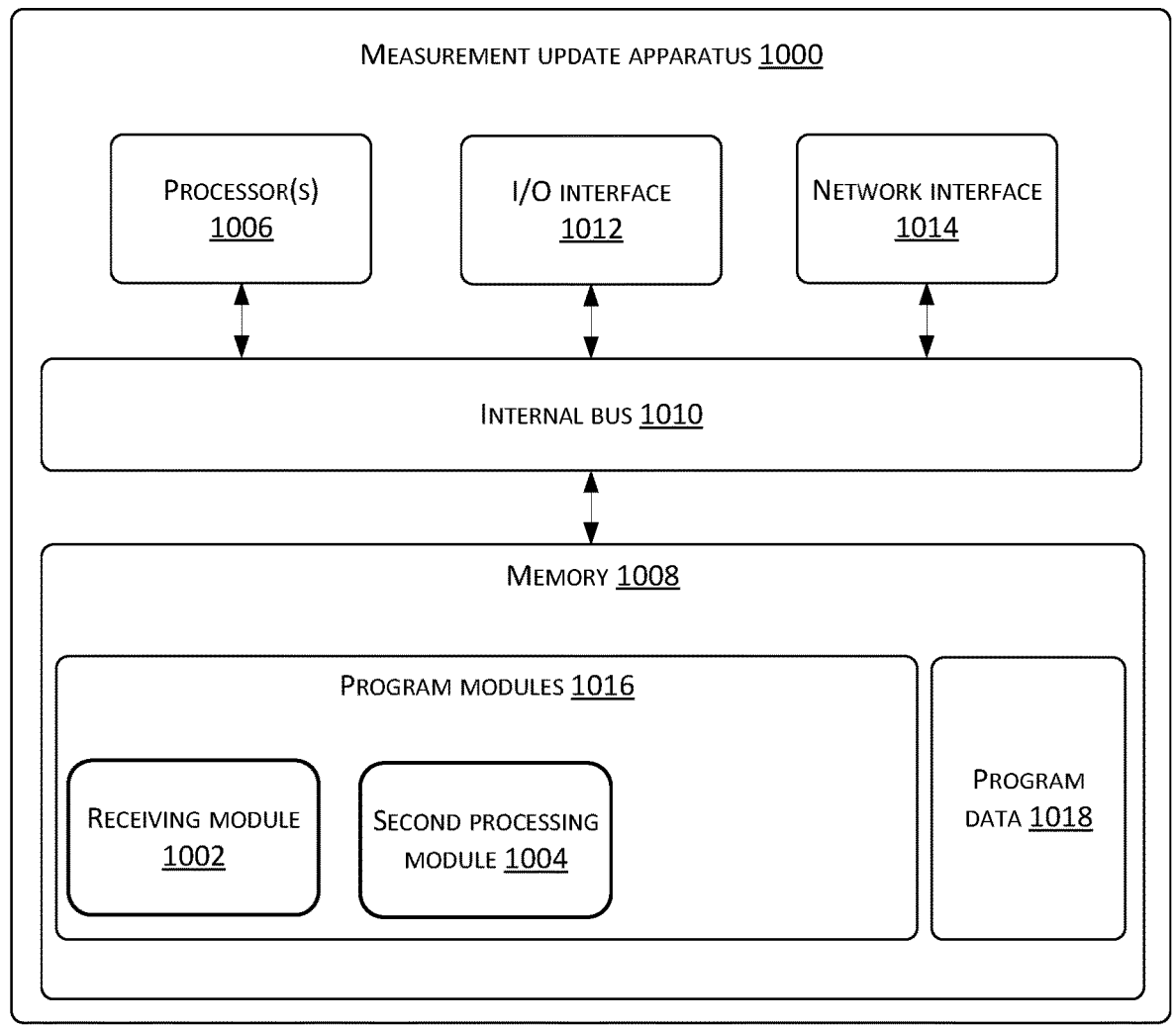
FIG. 10 is a schematic structural diagram of a measurement updating apparatus according to the fifth embodiment of the present disclosure.

According to the embodiments of the present disclosure, a measurement update apparatus 1000 for implementing the measurement update method shown in the second embodiment is further provided. FIG. 10 is a schematic structural diagram of a measurement update apparatus 1000 according to the fifth embodiment of the present disclosure. As shown in FIG. 10, the apparatus 1000 can be applied in a policy control center, and includes a receiving module 1002 and a second processing module 1004, which are described below.

The receiving module 1002 is configured to receive a measurement update request sent by a measurement update monitoring component, wherein the measurement update request is triggered by the measurement update monitoring component in response to detecting that the application device updates a measurement, and the measurement update request includes at least one of: an object update request for updating a measurement object, and a policy update request for updating a policy.

The second processing module 1004 is connected to the receiving module 1002, and is configured to perform measurement update processing upon verifying that the measurement update monitoring component is legitimate, wherein the measurement update processing includes: performing update processing at least one of content included in an execution of a measurement process, wherein the measurement process includes: calculating a measurement object using a predetermined algorithm, and comparing a calculation result with a pre-stored verification reference value, and determining that an integrity of the measurement object is not corrupted if a comparison result is consistent.

In implementations, the apparatus 1000 may further include one or more processors 1006, a memory 1008, and an internal bus 1010. In some implementations, the apparatus 1000 may further include an input/output (I/O) interface 1012, and a network interface 1014. The memory 1008 may include a form of processor readable media as described in the foregoing description.

In implementations, the memory 1008 may include program units 1016 and program data 1018. The program units 1016 may include one or more units as described in the foregoing description and shown in FIG. 10.

It should be noted that the receiving module 1002 and the second processing module 1004 correspond to operation S602 to operation S604 in the second embodiment. Examples and application scenarios implemented by these two modules and corresponding operations are the same, but are not limited to the above content described in the second embodiment. It should be noted that the above modules can be operated as a part of the apparatus in the computer terminal 100 provided in the first embodiment.

Sixth Embodiment

Figure 11:
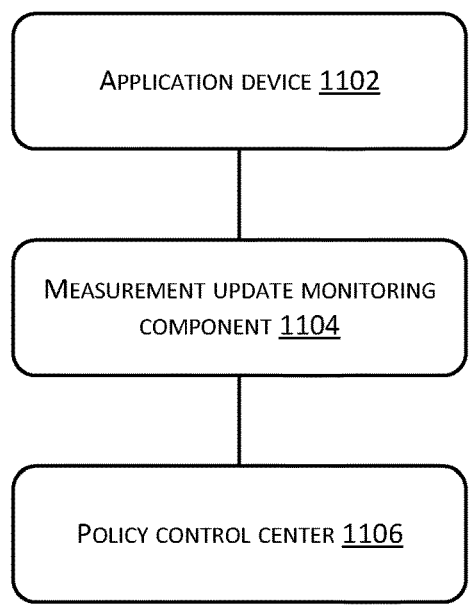
FIG. 11 is a schematic structural diagram of a measurement update system according to the sixth embodiment of the present disclosure.

According to the embodiments of the present disclosure, a measurement update system for implementing the measurement update method shown in the third embodiment is further provided. FIG. 11 is a schematic structural diagram of a measurement update system 1100 according to the sixth embodiment of the present disclosure. As shown in FIG. 11, the system 1100 includes an application device 1102, a measurement update monitoring component 1104, and a policy control center 1106, wherein:

the application device 1102 is configured to initiate a measurement update, wherein the measurement update includes at least one of: an object update that updates a measurement object, and a policy update that updates a policy;

the measurement update monitoring component 1104 is in communication with the application device 1102, and is configured to monitor and detect that to the application device initiates the measurement update, and verify whether the measurement update satisfies a predetermined condition;

the measurement update monitoring component 1104 and/or the policy control center 1106 is/are configured to perform measurement update processing if the measurement update satisfies a predetermined condition, wherein the measurement update processing includes: performing update processing on at least one of content included in an execution of a measurement process, wherein the measurement process includes: calculating a measurement object using a predetermined algorithm, and comparing a calculation result with a pre-stored verification reference value, and determining that an integrity of the measurement object is not corrupted if a comparison result is consistent.

It should be noted that the application device 1102, the measurement update monitoring component 1104, and the policy control center 1106 correspond to operations S802 to S806 in the third embodiment. Examples and application scenarios implemented by these three modules and corresponding operations are the same, but are not limited to the above content described in the third embodiment. It should be noted that the above modules can be operated as a part of the apparatus in the computer terminal 100 provided in the first embodiment.

Seventh Embodiment

The embodiments of the present disclosure may provide a computer terminal, which may be any computer terminal of a group of computer terminals. In implementations, in the present embodiment, the computer terminal may also be replaced with a terminal device such as a mobile terminal.

In implementations, in the present embodiment, the computer terminal may be located in at least one network device of a plurality of network devices of a computer network.

Figure 12:
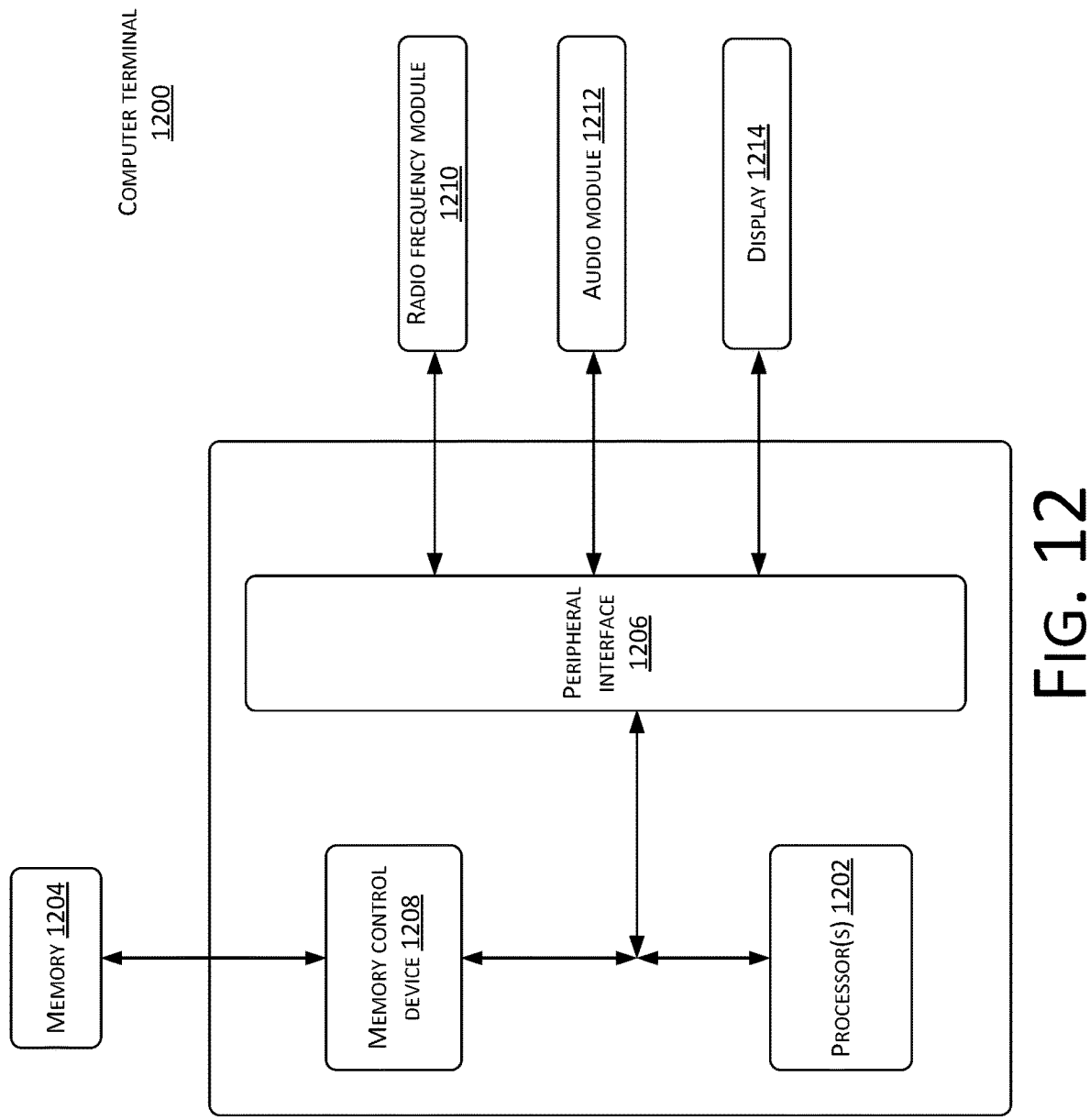
FIG. 12 is a structural block diagram of a computer terminal according to the embodiments of the present disclosure.

In implementations, FIG. 12 is a structural block diagram of a computer terminal 1200 according to the embodiments of the present disclosure. As shown in FIG. 12, the computer terminal 1200 can include one or more (only one shown) processors 1202, a memory 1204, and a peripheral interface 1206. In some implementations, the computer terminal 1200 may further include a memory control device 1208. In some implementations, the computer terminal 1200 may be associated or peripheral with a RF (radio frequency) module 1210, an audio module 1212, and a display 1214.

The memory 1204 can be used to store software programs and modules, such as program instructions/modules corresponding to the measurement update methods and the apparatuses in the embodiments of the present disclosure. The processors 1202 execute various functional applications and data processing by running software programs and modules stored in the memory 1204, i.e., implementing the above measurement update methods. The memory 1204 may include a high speed random access memory, and may also include non-volatile memory such as one or more magnetic storage devices, flash memory, or other non-volatile solid state memory. In some instances, the memory 1204 can further include storage devices remotely located relative to the processors. The remote storage devices can connect to the computer terminal over a network. Examples of such network include, but are not limited to, the Internet, an intranet, a local area network, a mobile communication network, and a combination thereof.

The processors 1202 may invoke information and an application program stored in the memory by a transmission device to perform the following operations: detecting that an application device initiates a measurement update, wherein the measurement update includes at least one of: an object update that updates a measurement object, and a policy update that updates a policy; and performing measurement update processing upon verifying that the measurement update satisfies a predetermined condition, wherein the measurement update processing includes performing an update process on at least one of content included in an execution of a measurement process, and wherein the measurement process includes calculating a measurement object using a predetermined algorithm, comparing a calculation result with a pre-stored verification reference value, and determining that an integrity of the measurement object is not corrupted if a comparison result is consistent.

In implementations, the processors may further execute program codes of the following operations: performing the measurement update processing including at least one of: the measurement update monitoring component performing the measurement update processing, and performing synchronization with the policy control center after the update processing is completed; the measurement update monitoring component initiating an update request to the policy control center, and the policy control center completing the measurement update processing for the application device.

In implementations, the processors may further execute program codes of the following operations: when the measurement update is an object update, the measurement update monitoring component performing the measurement update processing and performing the synchronization with the policy control center after the update processing is completed including: the measurement update monitoring component updating a locally stored measurement object to a new measurement object content, and returning a feedback about a completion of the measurement object update to the application device, and synchronizing the new measurement object content with the policy control center; and the measurement update monitoring component initiating the update request to the policy control center, and the policy control center completing the measurement update processing for the application device including: the measurement update monitoring component determining a new measurement object content, and after signing the update request including the new measurement object content using a private key of the measurement update monitoring component, sending the signed update request to the policy control center; and the policy control center controlling a local update to store the new measurement object content, and controlling the measurement update monitoring component to store the new measurement object content.

In implementations, the processors may further execute program codes of the following operations: sending the signed update request to the policy control center after the measurement update monitoring component signs the update request including the new measurement object content using the private key of the measurement update monitoring component, including: the measurement update monitoring component performing a hash calculation on the new measurement object content to obtain a hash value for the new measurement object content; and after signing the hash value using the private key of the measurement update monitoring component, sending the signed hash value to the policy control center.

In implementations, the processors may further execute program codes of the following operations: when the measurement update is a policy update and before performing the measurement update processing, further including: determining an operation feature of an operation performed on a policy file when a policy is updated; and when determining that the operation feature is a write operation performed on the policy file and a write instruction inputted in the application device is legitimate, allowing the measurement update processing to be performed by the write operation on the policy file.

In implementations, the processors may further execute program codes of the following operations: the measurement update monitoring component performing the measurement update processing, and after the update processing is completed, performing the synchronization with the policy control center including: the measurement update monitoring component updating a locally stored policy file to a new policy file through a write operation on the policy file, returning a feedback about an update completion of the policy file to the application device, and synchronizing the new policy file with the policy control center; and the measurement update monitoring component initiating an update request to the policy control center, and the policy control center completing the measurement update processing for the application device including: the measurement update monitoring component determining a new policy file, and signing the update request that includes the new policy file using the private key of the measurement update monitoring component, and sending the signed update request to the policy control center, and the policy control center controlling to store the new policy file locally and controlling the measurement update monitoring component to store the new policy file.

In implementations, the processors may further execute program codes of the following operations: the new measurement object content obtained by updating the measurement object including: a new measurement object, a new measurement policy for measuring the new measurement object, and a new verification policy corresponding to the new measurement policy, and the new policy file obtained by updating the policy corresponding to the policy including: a new measurement policy file, and a new verification file corresponding to the new measurement policy file.

The processors may also invoke information and an application program stored in the memory through the transmission device to perform the following operations: receiving a measurement update request sent by a measurement update monitoring component, wherein the measurement update request is triggered by the measurement update monitoring component in response to detecting a measurement update of an application device, the measurement update request including at least one of: an object update request for requesting an update of a measurement object, and a policy update request for requesting an update of a policy; and performing measurement update processing in response to verifying that the measurement update monitoring component is legitimate, wherein the measurement update processing includes: performing an update process on at least one of content included in an execution of a measurement process, wherein the measurement process includes calculating a measurement object using a predetermined algorithm, comparing a calculation result with a pre-stored verification reference value, and determining that an integrity of the measurement object is not corrupted if a comparison result is consistent.

In implementations, the processors may further execute program codes of the following operations: performing the measurement update processing including: under a circumstance that measurement update request includes a new measurement object content obtained by the measurement update monitoring component that has completed an update of a measurement object, and/or a new policy file obtained by the measurement update monitoring component that has completed an update of a policy file corresponding to a policy, performing a synchronization of the new measurement object content and/or the new policy file through a method of synchronization operations performed by the policy control center and the measurement update monitoring component; and under a circumstance that measurement update request does not include a new measurement object content obtained by the measurement update monitoring component that has completed an update of a measurement object, and/or a new policy file obtained by the measurement update monitoring component that has completed an update of a policy file corresponding to a policy, the policy control center performing the update of the measurement object and/or the update of the policy file, and storing the new measurement object content and/or the new policy file in the policy control center and the measurement update monitoring component.

In implementations, the processors may further execute program codes of the following operations: before performing the synchronization of the new measurement object content and/or the new policy file, further including: verifying the new measurement object content and/or the new policy file, and triggering the synchronization of new measurement object content and/or new policy files upon successful verification; or receiving the measurement update request sent by the measurement update monitoring component including receiving an update request signed by the private key of the measurement update monitoring component.

The processors may also invoke information and an application program stored in the memory through the transmission device to perform the following operations: an application device initiating a measurement update, wherein the measurement update includes at least one of: an object update that updates a measurement object, and a policy update that updates a policy; a measurement update monitoring component detecting that the application device initiates the measurement update, and verifying whether the measurement update satisfies a predetermined condition; and the measurement update monitoring component and/or a policy control center performing measurement update processing if the measurement update satisfies the predetermined condition.

In implementations, the processors may further execute program codes of the following operations: the measurement update monitoring component verifying whether the measurement update meets the predetermined condition including at least one of: the measurement update monitoring component verifying whether the application device that initiates the measurement update is a legitimate party; the measurement update monitoring component verifying whether updated version(s) of the measurement object and/or the policy is/are higher than existing version(s); the measurement update monitoring component verifying whether a measurement object and/or a policy higher than existing version(s) exist(s).

In implementations, the processors may further execute program codes of the following operations: the measurement update monitoring component and/or the policy control center performing the measurement update processing including: when the measurement update monitoring component stores the measurement object and/or the policy locally, the measurement update monitoring component updating the measurement object to obtain an updated measurement object, and/or updating a policy file corresponding to the policy to obtain an updated policy file, and synchronizing the updated measurement object and the updated policy file to the policy control center by performing a synchronization operation with the policy control center; and when the measurement update monitoring component does not store the measurement object and/or the policy locally, the measurement update monitoring component determining a new measurement object content and/or a new policy file, and after signing an update request including the new measurement object content and/or the new policy file using a private key of the measurement update monitoring component, sending thereof to the policy control center, and the policy control center controlling to locally update and store the new measurement object content and/or the new policy file, and controlling the measurement update monitoring component to store the new measurement object content and/or the new policy file.

In implementations, the processors may further execute program codes of the following operations: the measurement update monitoring component sending the update request including the new measurement object content to the policy control center including: the measurement update monitoring component performing a hash calculation on the new measurement object content to obtain a hash value; and the measurement update monitoring component signing the hash value using the private key of the measurement update monitoring component and sending thereof to the policy control center.

In implementations, the processors may further execute program codes of the following operations: the policy control center performing the measurement update processing including: the policy control center performing verification on the new measurement object content and/or the new policy file, and updating a locally stored measurement object to the new measurement object content and/or updating a locally stored policy file to a new policy file if the verification is passed, and sending the new measurement object content and/or the new policy file to the measurements update monitoring component for update and storage.

Using the embodiments of the present disclosure, solutions for a measurement update are provided. By using an application device to actively update a measurement that needs to be updated, and detecting that the measurement is updated by the application device, measurement update processing is performed upon verifying that a measurement update satisfies a predetermined condition, thus achieving the purpose of actively updating the measurement object, a measurement policy, and a corresponding verification policy by a service party (i.e., the application device). This thereby realizes the technical effects of updating content of the measurement object and the measurement policy that need to be updated in time, and hence solving the technical problems of the related technologies that a service party fails to actively update a policy in time, a process of updating configurations is cumbersome, and the continuity of a service cannot be guaranteed.

One skilled in the art can understand that the structure shown in FIG. 12 is merely illustrative, and the computer terminal can also be a terminal device, such as a smart phone (such as an Android mobile phone, an iOS mobile phone, etc.), a tablet computer, a handheld computer, and a mobile Internet device (MID), a PAD, etc. FIG. 12 does not limit the structure of the above electronic device. For example, the computer terminal 100 may also include more or fewer components (such as a network interface, a display device, etc.) than the ones shown in FIG. 12, or have a different configuration from that shown in FIG. 12.

One of ordinary skill in the art may understand that all or part of the operations of the foregoing embodiments may be completed by instructing hardware associated with a terminal device through a program. The program may be stored in a computer readable storage medium, and the storage medium may include: a flash disk, a read-only memory (ROM), a random access memory (RAM), a magnetic disk, or an optical disk, etc.

Eighth Embodiment

The embodiments of the present disclosure also provide a storage medium. In implementations, in the present embodiment, the storage medium may be used to store program codes executed by the measurement update methods provided by the foregoing embodiments.

In implementations, in the present embodiment, the storage medium may be located in any computer terminal of a group of computer terminals in a computer network, or in any mobile terminal of a group of mobile terminals.

In implementations, in the present embodiment, the storage medium is configured to store program codes for performing the following operations: detecting that an application device initiates a measurement update, wherein the measurement update includes at least one of: an object update that updates a measurement object, and a policy update that updates a policy; and performing measurement update processing upon verifying that the measurement update satisfies a predetermined condition, wherein the measurement update processing includes performing an update process on at least one of content included in an execution of a measurement process, and wherein the measurement process includes calculating a measurement object using a predetermined algorithm, comparing a calculation result with a pre-stored verification reference value, and determining that an integrity of the measurement object is not corrupted if a comparison result is consistent.

In implementations, in the present embodiment, the storage medium is configured to store program codes for performing the following operations: performing the measurement update processing including at least one of: the measurement update monitoring component performing the measurement update processing, and performing synchronization with the policy control center after the update processing is completed; the measurement update monitoring component initiating an update request to the policy control center, and the policy control center completing the measurement update processing for the application device.

In implementations, in the present embodiment, the storage medium is configured to store program codes for performing the following operations: when the measurement update is an object update, the measurement update monitoring component performing the measurement update processing and performing the synchronization with the policy control center after the update processing is completed including: the measurement update monitoring component updating a locally stored measurement object to a new measurement object content, and returning a feedback about a completion of the measurement object update to the application device, and synchronizing the new measurement object content with the policy control center; and the measurement update monitoring component initiating the update request to the policy control center, and the policy control center completing the measurement update processing for the application device including: the measurement update monitoring component determining a new measurement object content, and after signing the update request including the new measurement object content using a private key of the measurement update monitoring component, sending the signed update request to the policy control center; and the policy control center controlling a local update to store the new measurement object content, and controlling the measurement update monitoring component to store the new measurement object content.

In implementations, in the present embodiment, the storage medium is configured to store program code for performing the following operations: sending the signed update request to the policy control center after the measurement update monitoring component signs the update request including the new measurement object content using the private key of the measurement update monitoring component, including: the measurement update monitoring component performing a hash calculation on the new measurement object content to obtain a hash value for the new measurement object content; and after signing the hash value using the private key of the measurement update monitoring component, sending the signed hash value to the policy control center.

In implementations, in the present embodiment, the storage medium is configured to store program codes for performing the following operations: when the measurement update is a policy update and before performing the measurement update processing, further including: determining an operation feature of an operation performed on a policy file when a policy is updated; and when determining that the operation feature is a write operation performed on the policy file and a write instruction inputted in the application device is legitimate, allowing the measurement update processing to be performed by the write operation on the policy file.

In implementations, in the present embodiment, the storage medium is configured to store program codes for performing the following operations: the measurement update monitoring component performing the measurement update processing, and after the update processing is completed, performing the synchronization with the policy control center including: the measurement update monitoring component updating a locally stored policy file to a new policy file through a write operation on the policy file, returning a feedback about an update completion of the policy file to the application device, and synchronizing the new policy file with the policy control center; and the measurement update monitoring component initiating an update request to the policy control center, and the policy control center completing the measurement update processing for the application device including: the measurement update monitoring component determining a new policy file, and signing the update request that includes the new policy file using the private key of the measurement update monitoring component, and sending the signed update request to the policy control center, and the policy control center controlling to store the new policy file locally and controlling the measurement update monitoring component to store the new policy file.

In implementations, in the present embodiment, the storage medium is configured to store program codes for performing the following operations: the new measurement object content obtained by updating the measurement object including: a new measurement object, a new measurement policy for measuring the new measurement object, and a new verification policy corresponding to the new measurement policy, and the new policy file obtained by updating the policy corresponding to the policy including: a new measurement policy file, and a new verification file corresponding to the new measurement policy file.

In the present embodiment, the storage medium is further configured to store program codes for performing the following operations: receiving a measurement update request sent by a measurement update monitoring component, wherein the measurement update request is triggered by the measurement update monitoring component in response to detecting a measurement update of an application device, the measurement update request including at least one of: an object update request for requesting an update of a measurement object, and a policy update request for requesting an update of a policy; and performing measurement update processing in response to verifying that the measurement update monitoring component is legitimate, wherein the measurement update processing includes: performing an update process on at least one of content included in an execution of a measurement process, wherein the measurement process includes calculating a measurement object using a predetermined algorithm, comparing a calculation result with a pre-stored verification reference value, and determining that an integrity of the measurement In implementations, in the present embodiment, the storage medium is configured to store program codes for performing the following operations: performing the measurement update processing including: under a circumstance that measurement update request includes a new measurement object content obtained by the measurement update monitoring component that has completed an update of a measurement object, and/or a new policy file obtained by the measurement update monitoring component that has completed an update of a policy file corresponding to a policy, performing a synchronization of the new measurement object content and/or the new policy file through a method of synchronization operations performed by the policy control center and the measurement update monitoring component; and under a circumstance that measurement update request does not include a new measurement object content obtained by the measurement update monitoring component that has completed an update of a measurement object, and/or a new policy file obtained by the measurement update monitoring component that has completed an update of a policy file corresponding to a policy, the policy control center performing the update of the measurement object and/or the update of the policy file, and storing the new measurement object content and/or the new policy file in the policy control center and the measurement update monitoring component.

In implementations, in the present embodiment, the storage medium is configured to store program codes for performing the following operations: before performing the synchronization of the new measurement object content and/or the new policy file, further including: verifying the new measurement object content and/or the new policy file, and triggering the synchronization of new measurement object content and/or new policy files upon successful verification; or receiving the measurement update request sent by the measurement update monitoring component including receiving an update request signed by the private key of the measurement update monitoring component.

In the present embodiment, the storage medium is further configured to store program codes for performing the following operations: an application device initiating a measurement update, wherein the measurement update includes at least one of: an object update that updates a measurement object, and a policy update that updates a policy; a measurement update monitoring component detecting that the application device initiates the measurement update, and verifying whether the measurement update satisfies a predetermined condition; and the measurement update monitoring component and/or a policy control center performing measurement update processing if the measurement update satisfies the predetermined condition.

In implementations, in the present embodiment, the storage medium is configured to store program codes for performing the following operations: the measurement update monitoring component verifying whether the measurement update meets the predetermined condition including at least one of: the measurement update monitoring component verifying whether the application device that initiates the measurement update is a legitimate party; the measurement update monitoring component verifying whether updated version(s) of the measurement object and/or the policy is/are higher than existing version(s); the measurement update monitoring component verifying whether a measurement object and/or a policy higher than existing version(s) exist(s).

In implementations, in the present embodiment, the storage medium is configured to store program codes for performing the following operations: the measurement update monitoring component and/or the policy control center performing the measurement update processing including: when the measurement update monitoring component stores the measurement object and/or the policy locally, the measurement update monitoring component updating the measurement object to obtain an updated measurement object, and/or updating a policy file corresponding to the policy to obtain an updated policy file, and synchronizing the updated measurement object and the updated policy file to the policy control center by performing a synchronization operation with the policy control center; and when the measurement update monitoring component does not store the measurement object and/or the policy locally, the measurement update monitoring component determining a new measurement object content and/or a new policy file, and after signing an update request including the new measurement object content and/or the new policy file using a private key of the measurement update monitoring component, sending thereof to the policy control center, and the policy control center controlling to locally update and store the new measurement object content and/or the new policy file, and controlling the measurement update monitoring component to store the new measurement object content and/or the new policy file.

In implementations, in the present embodiment, the storage medium is configured to store program codes for performing the following operations: the measurement update monitoring component sending the update request including the new measurement object content to the policy control center including: the measurement update monitoring component performing a hash calculation on the new measurement object content to obtain a hash value; and the measurement update monitoring component signing the hash value using the private key of the measurement update monitoring component and sending thereof to the policy control center.

In implementations, in the present embodiment, the storage medium is configured to store program codes for performing the following operations: the policy control center performing the measurement update processing including: the policy control center performing verification on the new measurement object content and/or the new policy file, and updating a locally stored measurement object to the new measurement object content and/or updating a locally stored policy file to a new policy file if the verification is passed, and sending the new measurement object content and/or the new policy file to the measurements update monitoring component for update and storage.

The serial numbers of the embodiments of the present disclosure are merely used for description, and do not represent advantages and disadvantages of the embodiments.

In the above embodiments of the present disclosure, emphases of the descriptions of the various embodiments are different, and a part that is not detailed in a certain embodiment can be referenced to related descriptions of other embodiments.

In a number of embodiments provided by the present application, it should be understood that the disclosed technical content may be implemented in other manners. The apparatus embodiments described above are merely illustrative. For example, a division of units is only a logical division of functions. In practical implementations, other manners of division may exist. For example, multiple units or components may be combined or may be integrated into another system, or some features may be ignored or not executed. In addition, mutual coupling or direct coupling or communication connection that is shown or discussed may be an indirect coupling or communication connection through some interface, unit or module, and may be in an electrical or other form.

The units described as separate components may or may not be physically separate, and the components displayed as units may or may not be physical units, i.e., may be located in one place, or may be distributed among multiple network units. Some or all of the units may be selected according to practical needs to achieve the purpose of the solutions of the present embodiments.

In addition, various functional units in various embodiments of the present disclosure may be integrated into a single processing unit, or each unit may exist as a physical entity separately. Alternatively, two or more units may be integrated into a single unit. The above integrated unit can be implemented in a form of hardware or in a form of a software functional unit.

The integrated unit, if implemented in a form of a software functional unit and sold or used as a standalone product, can be stored in a computer readable storage medium. Based on such understanding, the essence of the technical solutions of the present disclosure, the parts that make contributions to the existing technologies, or all or part of the technical solutions, may be embodied in a form of a software product. The computer software product is stored in a storage medium number of instructions, and includes a number of instructions to cause a computing device (which may be a personal computer, a server, or a network device, etc.) to perform all or part of the operations of various embodiments of the present disclosure. The storage medium includes: a flash disk, a read-only memory (ROM), a random access memory (RAM), a removable hard disk, a magnetic disk, or an optical disk, etc.

The above descriptions are merely the exemplary embodiments of the present disclosure. It should be noted that one skilled in the art can also make a number of improvements and modifications without departing from the principles of the present disclosure. These improvements and modifications shall be considered as the scope of protection of the present disclosure.

The present disclosure can be further understood using the following clauses.

Clause 1: A measurement update method comprising: detecting that an application device initiates a measurement update, wherein the measurement update comprises at least one of: an object update that updates a measurement object, and a policy update that updates a policy; and performing measurement update processing upon verifying that the measurement update satisfies a predetermined condition, wherein the measurement update processing comprises performing an update process on at least one of content included in an execution of a measurement process, and wherein the measurement process comprises calculating a measurement object using a predetermined algorithm, comparing a calculation result with a pre-stored verification reference value, and determining that an integrity of the measurement object is not corrupted if a comparison result is consistent.

Clause 2: The method of Clause 1, wherein performing the measurement update processing comprises at least one of: the measurement update monitoring component performing the measurement update processing, and performing synchronization with the policy control center after the update processing is completed; the measurement update monitoring component initiating an update request to the policy control center, and the policy control center completing the measurement update processing for the application device.

Clause 3: The method of Clause 2, wherein: when the measurement update is an object update, the measurement update monitoring component performing the measurement update processing and performing the synchronization with the policy control center after the update processing is completed comprises: the measurement update monitoring component updating a locally stored measurement object to a new measurement object content, and returning a feedback about a completion of the measurement object update to the application device, and synchronizing the new measurement object content with the policy control center; and the measurement update monitoring component initiating the update request to the policy control center, and the policy control center completing the measurement update processing for the application device comprises: the measurement update monitoring component determining a new measurement object content, and after signing the update request comprising the new measurement object content using a private key of the measurement update monitoring component, sending the signed update request to the policy control center; and the policy control center controlling a local update to store the new measurement object content, and controlling the measurement update monitoring component to store the new measurement object content.

Clause 4: The method of Clause 3, wherein sending the signed update request to the policy control center after the measurement update monitoring component signs the update request comprising the new measurement object content using the private key of the measurement update monitoring component, comprises: the measurement update monitoring component performing a hash calculation on the new measurement object content to obtain a hash value for the new measurement object content; and after signing the hash value using the private key of the measurement update monitoring component, sending the signed hash value to the policy control center.

Clause 5: The method of Clause 2, wherein: when the measurement update is a policy update and before performing the measurement update processing, the method further comprises: determining an operation feature of an operation performed on a policy file when a policy is updated; and when determining that the operation feature is a write operation performed on the policy file and a write instruction inputted in the application device is legitimate, allowing the measurement update processing to be performed by the write operation on the policy file.

Clause 6: The method of Clause 2, wherein: the measurement update monitoring component performing the measurement update processing, and performing the synchronization with the policy control center after the update processing is completed, comprise: the measurement update monitoring component updating a locally stored policy file to a new policy file through a write operation on the policy file, returning a feedback about an update completion of the policy file to the application device, and synchronizing the new policy file with the policy control center; and the measurement update monitoring component initiating an update request to the policy control center, and the policy control center completing the measurement update processing for the application device comprise: the measurement update monitoring component determining a new policy file, and signing the update request that comprises the new policy file using the private key of the measurement update monitoring component, and sending the signed update request to the policy control center, and the policy control center controlling to store the new policy file locally and controlling the measurement update monitoring component to store the new policy file.

Clause 7: The method of any one of Clauses 1-5, wherein: the new measurement object content obtained by updating the measurement object comprises: a new measurement object, a new measurement policy for measuring the new measurement object, and a new verification policy corresponding to the new measurement policy, and the new policy file obtained by updating the policy corresponding to the policy comprises: a new measurement policy file, and a new verification file corresponding to the new measurement policy file.

Clause 8: A measurement update method comprising: receiving a measurement update request sent by a measurement update monitoring component, wherein the measurement update request is triggered by the measurement update monitoring component in response to detecting a measurement update of an application device, the measurement update request comprising at least one of: an object update request for requesting an update of a measurement object, and a policy update request for requesting an update of a policy; and performing measurement update processing in response to verifying that the measurement update monitoring component is legitimate, wherein the measurement update processing comprises: performing an update process on at least one of content included in an execution of a measurement process, wherein the measurement process comprises calculating a measurement object using a predetermined algorithm, comparing a calculation result with a pre-stored verification reference value, and determining that an integrity of the measurement object is not corrupted if a comparison result is consistent.

Clause 9: The method of Clause 8, wherein performing the measurement update processing comprises: under a circumstance that measurement update request comprises a new measurement object content obtained by the measurement update monitoring component that has completed an update of a measurement object, and/or a new policy file obtained by the measurement update monitoring component that has completed an update of a policy file corresponding to a policy, performing a synchronization of the new measurement object content and/or the new policy file through a method of synchronization operations performed by the policy control center and the measurement update monitoring component; and under a circumstance that measurement update request does not comprise a new measurement object content obtained by the measurement update monitoring component that has completed an update of a measurement object, and/or a new policy file obtained by the measurement update monitoring component that has completed an update of a policy file corresponding to a policy, the policy control center performing the update of the measurement object and/or the update of the policy file, and storing the new measurement object content and/or the new policy file in the policy control center and the measurement update monitoring component.

Clause 10: The method of Clause 9, wherein: before performing the synchronization of the new measurement object content and/or the new policy file, the method further comprises: verifying the new measurement object content and/or the new policy file, and triggering the synchronization of new measurement object content and/or new policy files upon successful verification; or receiving the measurement update request sent by the measurement update monitoring component comprises receiving an update request signed by the private key of the measurement update monitoring component.

Clause 11: A measurement update method comprising: an application device initiating a measurement update, wherein the measurement update comprises at least one of: an object update that updates a measurement object, and a policy update that updates a policy; a measurement update monitoring component detecting that the application device initiates the measurement update, and verifying whether the measurement update satisfies a predetermined condition; and the measurement update monitoring component and/or a policy control center performing measurement update processing if the measurement update satisfies the predetermined condition, wherein the measurement update processing comprises: performing an update process on at least one of content included in an execution of a measurement process, wherein the measurement process comprises calculating a measurement object using a predetermined algorithm, comparing a calculation result with a pre-stored verification reference value, and determining that an integrity of the measurement object is not corrupted if a comparison result is consistent.

Clause 12: The method of Clause 11, wherein the measurement update monitoring component verifying whether the measurement update meets the predetermined condition comprises: the measurement update monitoring component verifying whether the application device that initiates the measurement update is a legitimate party; the measurement update monitoring component verifying whether updated version(s) of the measurement object and/or the policy is/are higher than existing version(s); or the measurement update monitoring component verifying whether a measurement object and/or a policy higher than existing version(s) exist(s).

Clause 13: The method of Clause 11, wherein the measurement update monitoring component and/or the policy control center performing the measurement update processing comprise: when the measurement update monitoring component stores the measurement object and/or the policy locally, the measurement update monitoring component updating the measurement object to obtain an updated measurement object, and/or updating a policy file corresponding to the policy to obtain an updated policy file, and synchronizing the updated measurement object and the updated policy file to the policy control center by performing a synchronization operation with the policy control center; and when the measurement update monitoring component does not store the measurement object and/or the policy locally, the measurement update monitoring component determining a new measurement object content and/or a new policy file, and after signing an update request comprising the new measurement object content and/or the new policy file using a private key of the measurement update monitoring component, sending thereof to the policy control center, and the policy control center controlling to locally update and store the new measurement object content and/or the new policy file, and controlling the measurement update monitoring component to store the new measurement object content and/or the new policy file.

Clause 14: The method of Clause 13, wherein the measurement update monitoring component sending the update request comprising the new measurement object content to the policy control center comprises: the measurement update monitoring component performing a hash calculation on the new measurement object content to obtain a hash value; and the measurement update monitoring component signing the hash value using the private key of the measurement update monitoring component and sending thereof to the policy control center.

Clause 15: The method of any one of Clauses 11-14, wherein the policy control center performing the measurement update processing comprises: the policy control center performing verification on the new measurement object content and/or the new policy file, and updating a locally stored measurement object to the new measurement object content and/or updating a locally stored policy file to a new policy file if the verification is passed, and sending the new measurement object content and/or the new policy file to the measurements update monitoring component for update and storage.

Clause 16: A measurement update apparatus, which is applied to a measurement update monitoring component, comprising: a monitoring module configured to detect that an application device initiates a measurement update, wherein the measurement update comprises at least one of: an object update that updates a measurement object, and a policy update that updates a policy; and a first processing module configured to perform measurement update processing upon verifying that the measurement update satisfies a predetermined condition, wherein the measurement update processing comprises performing an update process on at least one of content included in an execution of a measurement process, and wherein the measurement process comprises calculating a measurement object using a predetermined algorithm, comparing a calculation result with a pre-stored verification reference value, and determining that an integrity of the measurement object is not corrupted if a comparison result is consistent.

Clause 17: A measurement update apparatus, which is applied to a policy control center, comprising: a receiving module configured to receive a measurement update request sent by a measurement update monitoring component, wherein the measurement update request is triggered by the measurement update monitoring component in response to detecting a measurement update of an application device, the measurement update request comprising at least one of: an object update request for requesting an update of a measurement object, and a policy update request for requesting an update of a policy; and a second processing module configured to perform measurement update processing in response to verifying that the measurement update monitoring component is legitimate, wherein the measurement update processing comprises: performing an update process on at least one of content included in an execution of a measurement process, wherein the measurement process comprises calculating a measurement object using a predetermined algorithm, comparing a calculation result with a pre-stored verification reference value, and determining that an integrity of the measurement object is not corrupted if a comparison result is consistent.

Clause 18: A measurement update system comprising: an application device, a measurement update monitoring component, and a policy control center, wherein: the application device is configured to initiate a measurement update, wherein the measurement update comprises at least one of: an object update that updates a measurement object, and a policy update that updates a policy; the measurement update monitoring component is configured to detect that the application device initiates the measurement update, and verify whether the measurement update satisfies a predetermined condition; and the measurement update monitoring component and/or a policy control center is/are configured to perform measurement update processing if the measurement update satisfies the predetermined condition, wherein the measurement update processing comprises: performing an update process on at least one of content included in an execution of a measurement process, wherein the measurement process comprises calculating a measurement object using a predetermined algorithm, comparing a calculation result with a pre-stored verification reference value, and determining that an integrity of the measurement object is not corrupted if a comparison result is consistent.

Clause 19: A storage medium, wherein the storage medium comprising a stored program, and the program, when running, controls a device where the storage medium is located to perform the measurement update method of any one of Clauses 1-15.

Clause 20: A computing device comprising: a memory and a processor, the memory storing a computer program, the processor configured to execute the computer program stored in the memory, and the computer program, when running, performing the measurement update method of any one of Clauses 1-15.

What is claimed is:
1. A method implemented by one or more processors of a computing device, the method comprising:
   detecting that an application device initiates a measurement update, the measurement update comprising at least one of:
      an object update that updates a measurement object; and
      a policy update that updates a policy; and
   performing a measurement update processing upon verifying that the measurement update satisfies a predetermined condition,
   wherein:
   the measurement update processing comprises performing an update process on at least one of content included in an execution of a measurement process, the measurement process comprising:
      calculating a measurement object using a predetermined algorithm;
      comparing a calculation result with a pre-stored verification reference value; and
      determining that an integrity of the measurement object is not corrupted in response to determining that a comparison result is consistent; and
   the performing the measurement update processing comprises at least one of:
      performing the measurement update processing and performing a synchronization with a policy control center after the measurement update processing is completed; and
      initiating an update request to the policy control center to complete the measurement update processing for the application device.

2. The method of claim 1, wherein:
in response to determining that the measurement update is the object update, the performing the measurement update processing and performing the synchronization with the policy control center after the update process is completed comprises:
   updating a locally stored measurement object to a new measurement object content;
   returning a feedback about a completion of the updating of the locally stored measurement object to the application device; and
   synchronizing the new measurement object content with the policy control center.

3. The method of claim 1, wherein:
in response to determining that the measurement update is the object update, the initiating the update request to the policy control center to complete the measurement update processing for the application device comprises:
determining a new measurement object content; and
after signing an update request comprising the new measurement object content using a private key, sending the signed update request to the policy control center, the policy control center controlling a local update to store the new measurement object content, and storing the new measurement object content.

4. The method of claim 3, wherein the sending the signed update request to the policy control center comprises:
performing a hash calculation on the new measurement object content to obtain a hash value for the new measurement object content; and
after signing the hash value using the private key, sending the signed hash value to the policy control center.

5. The method of claim 3, wherein the new measurement object content comprises at least one of:
a new measurement object;
a new measurement policy for measuring the new measurement object; or
a new verification policy corresponding to the new measurement policy.

6. The method of claim 1, wherein:
in response to determining that the measurement update is a policy update and before performing the measurement update processing, the method further comprises:
determining an operation feature of an operation performed on a policy file in response to determining that a policy is updated; and
in response to determining that the operation feature is a write operation performed on the policy file and a write instruction inputted in the application device is legitimate, allowing the measurement update processing to be performed by the write operation on the policy file.

7. The method of claim 1, wherein the performing the measurement update processing and performing the synchronization with the policy control center after the measurement update processing is completed comprise:
updating a locally stored policy file through a write operation on the locally stored policy file;
returning a feedback about an update completion of the locally stored policy file to the application device; and
synchronizing the updated locally stored policy file with the policy control center.

8. The method of claim 1, wherein the performing the measurement update processing and performing the synchronization with the policy control center after the measurement update processing is completed comprise:
determining a new policy file;
signing the update request that comprises the new policy file using a private key; and
sending the signed update request to the policy control center.

9. The method of claim 8, wherein the new policy file comprises at least one of:
a new measurement policy file; or
a new verification file corresponding to the new measurement policy file.

10. One or more computer readable media storing executable instructions that, when executed by one or more processors, cause the one or more processors to perform acts comprising:
receiving a measurement update request sent by a measurement update monitoring component, the measurement update request being triggered by the measurement update monitoring component in response to detecting a measurement update of an application device, the measurement update request comprising at least one of:
an object update request for requesting an update of a measurement object; and
a policy update request for requesting an update of a policy; and
performing measurement update processing in response to verifying that the measurement update monitoring component is legitimate, the measurement update processing comprising performing an update process on at least one of content included in an execution of a measurement process.

11. The one or more computer readable media of claim 10, wherein the measurement process comprises:
calculating a measurement object using a predetermined algorithm;
comparing a calculation result with a pre-stored verification reference value; and
determining that an integrity of the measurement object is not corrupted in response to determining that a comparison result is consistent.

12. The one or more computer readable media of claim 10, wherein the performing the measurement update processing comprises:
under a circumstance that the measurement update request comprises a new measurement object content obtained by the measurement update monitoring component that has completed an update of the measurement object, or a new policy file obtained by the measurement update monitoring component that has completed an update of a policy file corresponding to the policy, performing a synchronization of the new measurement object content or the new policy file through a method of synchronization operations performed by a policy control center and the measurement update monitoring component.

13. The one or more computer readable media of claim 12, wherein:
before performing the synchronization of the new measurement object content or the new policy file, the method further comprises:
verifying the new measurement object content or the new policy file, and triggering the synchronization of new measurement object content or the new policy file upon a successful verification; or
receiving the measurement update request sent by the measurement update monitoring component comprises, the receiving comprising receiving the measurement update request signed by a private key of the measurement update monitoring component.

14. The one or more computer readable media of claim 10, wherein the performing the measurement update processing comprises:
under a circumstance that the measurement update request does not comprise a new measurement object content obtained by the measurement update monitoring component that has completed an update of the measurement object, or a new policy file obtained by the measurement update monitoring component that has completed an update of a policy file corresponding to the policy, requesting a policy control center to perform the update of the measurement object or the update of the policy file, and store the new measurement object content or the new policy file in the policy control center and the measurement update monitoring component.

15. A system comprising:
an application device configured to initiate a measurement update, measurement update comprising at least one of:
an object update that updates a measurement object; and
a policy update that updates a policy; and
a measurement update monitoring component configured to detect that the application device initiates the measurement update, verify whether the measurement update satisfies a predetermined condition, and perform a measurement update processing in response to determining that the measurement update satisfies the predetermined condition, the performing the measurement update processing comprising at least one of:
the measurement update monitoring component performing the measurement update processing and performing synchronization with a policy control center after the measurement update processing is completed; and
the measurement update monitoring component initiating an update request to the policy control center, and the policy control center completing the measurement update processing.

16. The system of claim 15, wherein:
the measurement update processing comprises performing an update process on at least one of content included in an execution of a measurement process, wherein the measurement process comprises:
calculating a measurement object using a predetermined algorithm;
comparing a calculation result with a pre-stored verification reference value; and
determining that an integrity of the measurement object is not corrupted in response to determining that a comparison result is consistent.

17. The system of claim 15, wherein the measurement update monitoring component configured to verify whether the measurement update meets the predetermined condition comprises that the measurement update monitoring component configured to perform acts comprising:
verifying whether the application device that initiates the measurement update is a legitimate party;
verifying whether an updated version of at least one of the measurement object or the policy is higher than an existing version; or
verifying whether a measurement object or a policy higher than the existing version exists.

18. The system of claim 15, wherein the performing the measurement update processing further comprises:
in response to determining that the measurement update monitoring component stores the measurement object or the policy locally,
updating the measurement object to obtain an updated measurement object, or updating a policy file corresponding to the policy to obtain an updated policy file; and
synchronizing the updated measurement object or the updated policy file to the policy control center by performing a synchronization operation with the policy control center; or
in response to determining that the measurement update monitoring component does not store the measurement object or the policy locally,
determining a new measurement object content or a new policy file; and
after signing an update request comprising the new measurement object content or the new policy file using a private key of the measurement update monitoring component, sending the update request to the policy control center, so that the policy control center controls to locally update and store the new measurement object content or the new policy file, and control the measurement update monitoring component to store the new measurement object content or the new policy file.

19. The system of claim 18, wherein the sending the update request comprising the new measurement object content to the policy control center comprises:
performing a hash calculation on the new measurement object content to obtain a hash value; and
after signing the hash value using the private key of the measurement update monitoring component, sending signed hash value to the policy control center.

20. The method of claim 1, wherein a measurement update monitoring component performs the measurement update processing.

* * * * *